US012424054B2

(12) United States Patent
Dundaraddi et al.

(10) Patent No.: US 12,424,054 B2
(45) Date of Patent: Sep. 23, 2025

(54) BARTOP GAMING DEVICE INCLUDING A LIFT ASSEMBLY FOR A BUTTON DECK

(71) Applicant: Aristocrat Technologies, Inc., Las Vegas, NV (US)

(72) Inventors: Kiran Dundaraddi, Las Vegas, NV (US); Timothy Barbour, Nolensville, TN (US); Victor McClearen, Lewisburg, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 261 days.

(21) Appl. No.: 18/350,652

(22) Filed: Jul. 11, 2023

(65) Prior Publication Data

US 2024/0087400 A1 Mar. 14, 2024

Related U.S. Application Data

(60) Provisional application No. 63/375,654, filed on Sep. 14, 2022.

(51) Int. Cl.
*A63F 13/00* (2014.01)
*G07F 17/32* (2006.01)

(52) U.S. Cl.
CPC ...... *G07F 17/3216* (2013.01); *G07F 17/3209* (2013.01)

(58) Field of Classification Search
None
See application file for complete search history.

(56) References Cited

U.S. PATENT DOCUMENTS

| | | | |
|---|---|---|---|
| 8,870,663 | B2 | 10/2014 | Cole |
| 10,559,165 | B1 | 2/2020 | Kelley |
| 10,672,222 | B2 | 6/2020 | Urban |
| 11,217,061 | B2 | 1/2022 | Urban |
| 2009/0221375 | A1 | 9/2009 | Luciano, Jr. |

*Primary Examiner* — Paul A D'Agostino
(74) *Attorney, Agent, or Firm* — Armstrong Teasdale LLP

(57) ABSTRACT

A bartop gaming device includes a housing base; a button deck assembly having one or more buttons for receiving player inputs during game play on the gaming device; and a lift assembly for raising or lowering the button deck assembly relative to the housing to service the button deck or an area of the gaming device covered by the button deck. The lift assembly includes a lift frame supporting the button deck assembly, an arm leg pivotally connected to the lift frame and extending to a track, and an actuator that includes a piston coupled to the lift frame.

20 Claims, 27 Drawing Sheets

BARTOP GAMING DEVICE INCLUDING A LIFT ASSEMBLY FOR A BUTTON DECK

CROSS REFERENCE TO RELATED APPLICATIONS

This application claims priority to U.S. Patent Application No. 63/375,654, filed Sep. 14, 2022, the entire contents of which are hereby incorporated by reference.

TECHNICAL FIELD

The field of disclosure relates generally to electronic gaming devices, and more particularly, to a bartop gaming device having a button deck and a lift assembly for the button deck.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. To play on EGMs, a player is typically establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a bartop gaming device is provided. The bartop gaming device includes a housing, a button deck assembly, and a lift assembly for moving the button deck assembly relative to the housing. The lift assembly includes a lift frame supporting the button deck assembly, an arm pivotally coupled to the lift frame and extending to a track, and an actuator. The actuator includes a piston coupled to the lift frame that is moveable relative to the track to move the button deck assembly.

In another aspect a gaming device is provided. The gaming device includes a cabinet, a button deck, and a lift assembly coupling the button deck to the cabinet. The lift assembly includes an arm pivotally coupled to the button deck and extending to a track, and an actuator coupled to the button deck and configured to move the button deck relative to the cabinet. The device further includes a release assembly coupled to the cabinet and selectively securing the button deck in position relative to the cabinet.

In yet another aspect a method for assembling a gaming device is provided. The method includes coupling a button deck assembly to a lift frame of a lift assembly configured to move the button deck assembly relative to a housing of the gaming device. The method further includes coupling, pivotally, an arm to the lift frame, the arm extending to a track. The method further includes coupling a piston of an actuator to the lift frame, where the piston is moveable relative to the track to move the button deck assembly.

DETAILED DESCRIPTION

The systems and methods described herein include a bartop gaming device that includes a housing and a button deck assembly having one or more buttons for receiving player inputs during game play on the gaming device. The gaming device further includes a lift assembly for raising or lowering the button deck assembly relative to the housing, such as, for example, to service the button deck or an area of the gaming device covered by the button deck. The lift assembly includes a lift frame supporting the button deck assembly, an arm pivotally connected to the lift frame and extending to a track, and an actuator that includes a piston coupled to the lift frame. The piston is moveable relative to the track to move the button deck assembly. The lift frame, which is supporting the button deck assembly; the arm pivotally connected to the lift frame and extending to the track; and the actuator including the piston coupled to the lift frame which is moveable relative to the track and can move the button deck assembly are allowing the lift assembly to: (1) raise the button deck assembly from the housing for servicing; and (2) allow an operator to access regions underneath or within the button deck without needing to hold the button deck. For example, if a spill occurs on a game top of the gaming device that requires servicing, an operator may activate the lift assembly to raise the button deck from the housing, providing access to an interior portion of the gaming device for cleaning. The operator may clean the device beneath the button deck without needing to remove the button deck from the gaming device.

Figure 1:
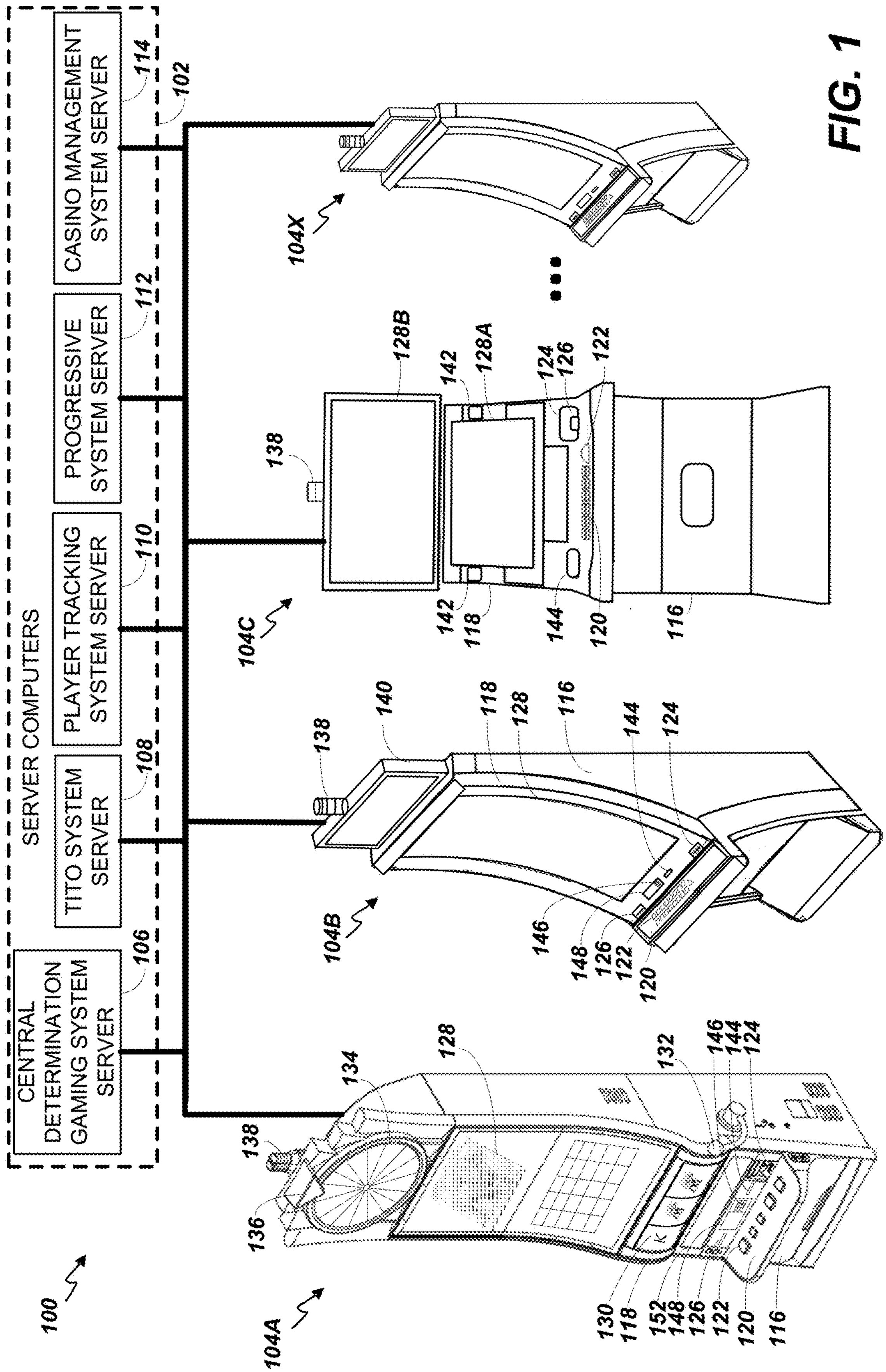
FIG. 1 is an exemplary diagram showing several gaming machines networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Reim XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, and/or total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
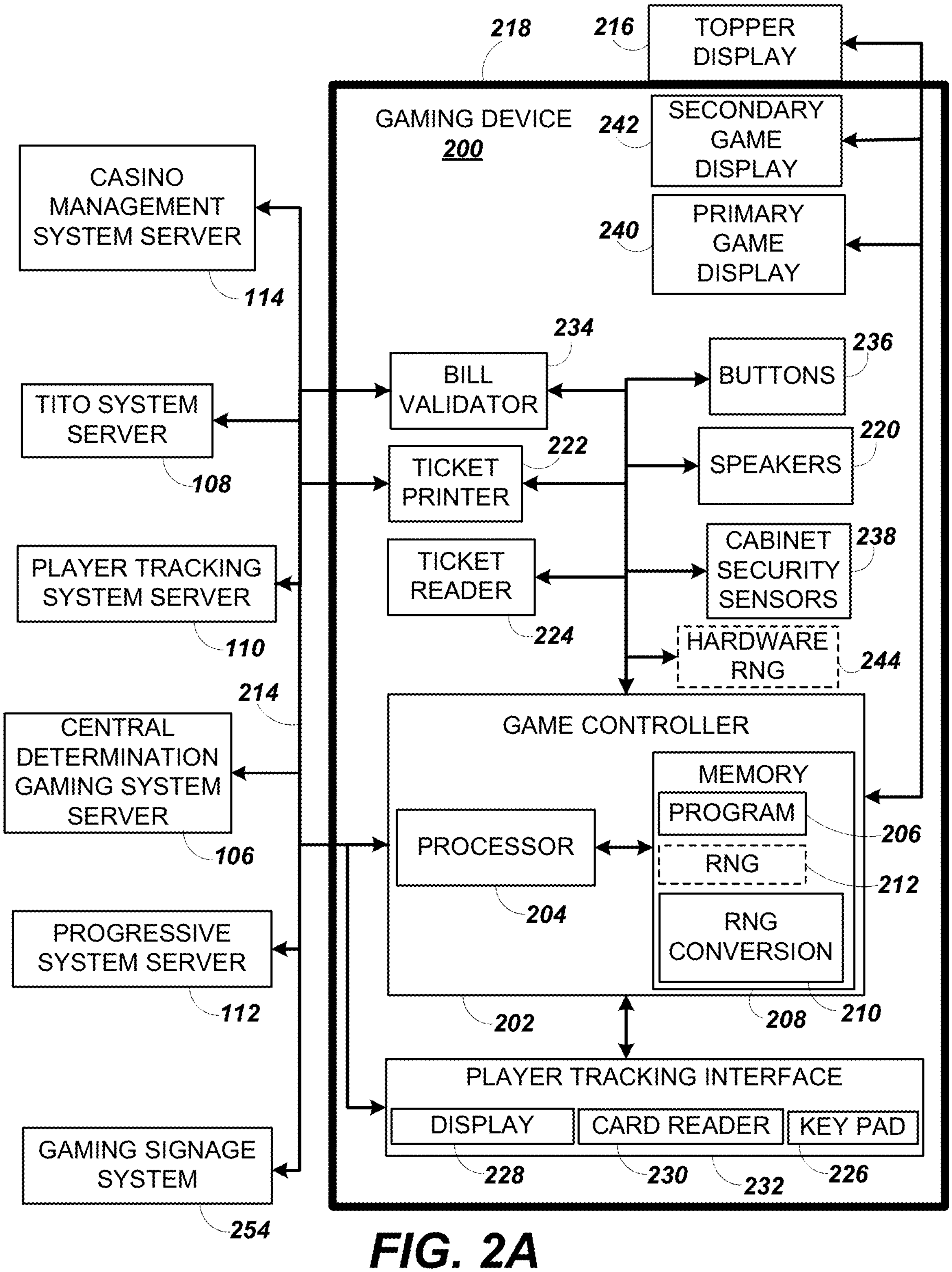
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218.

Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
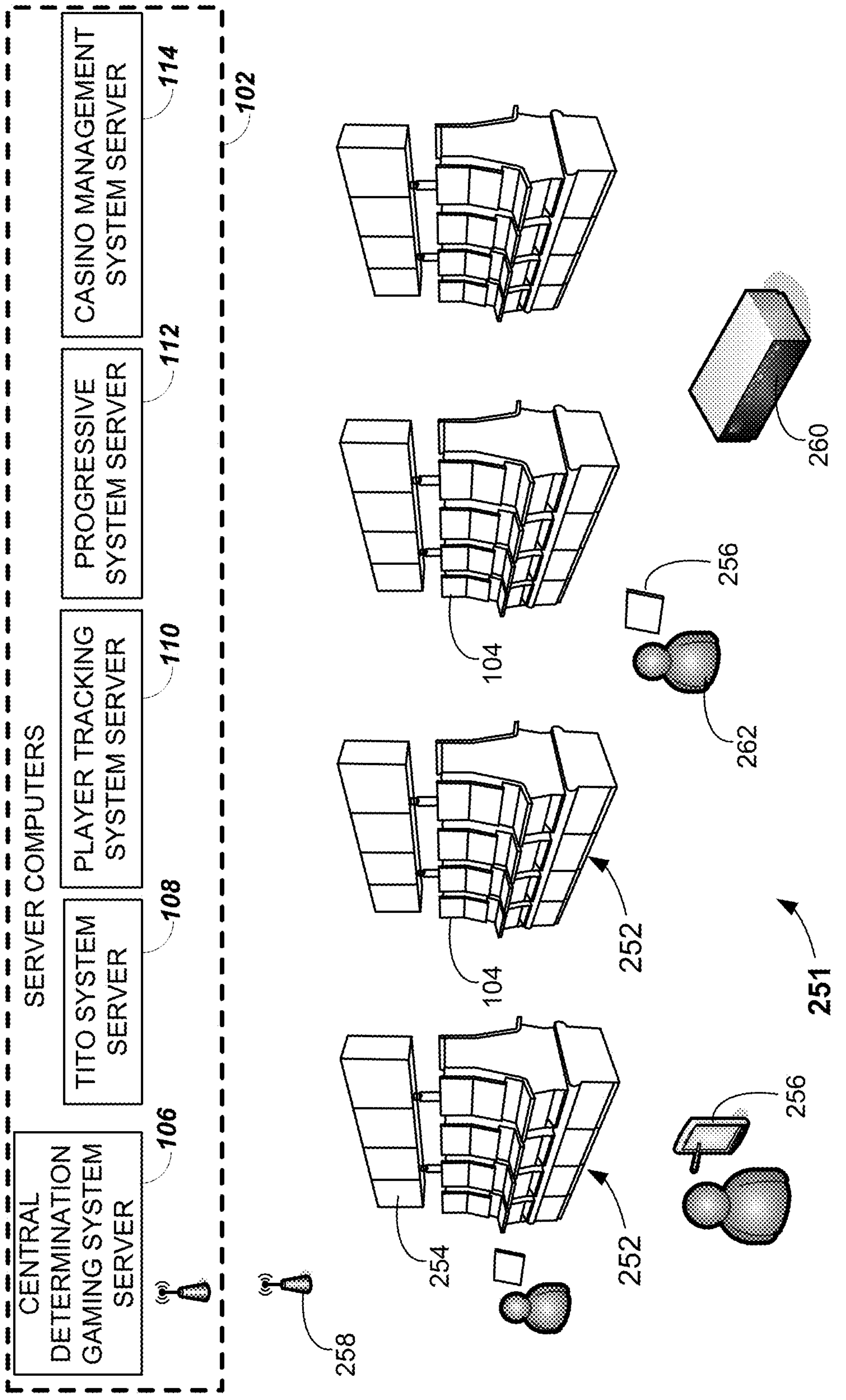
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
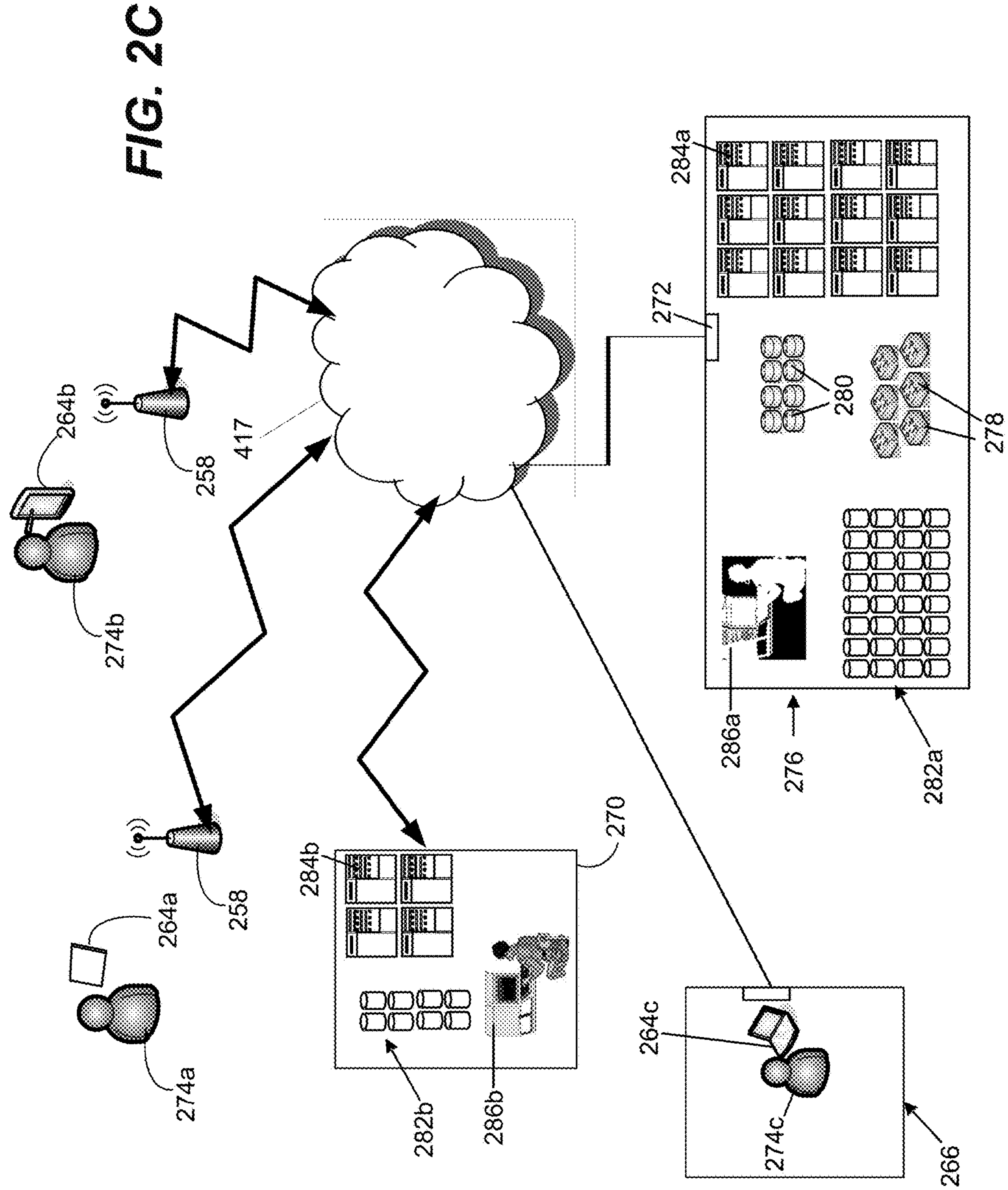
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*b*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
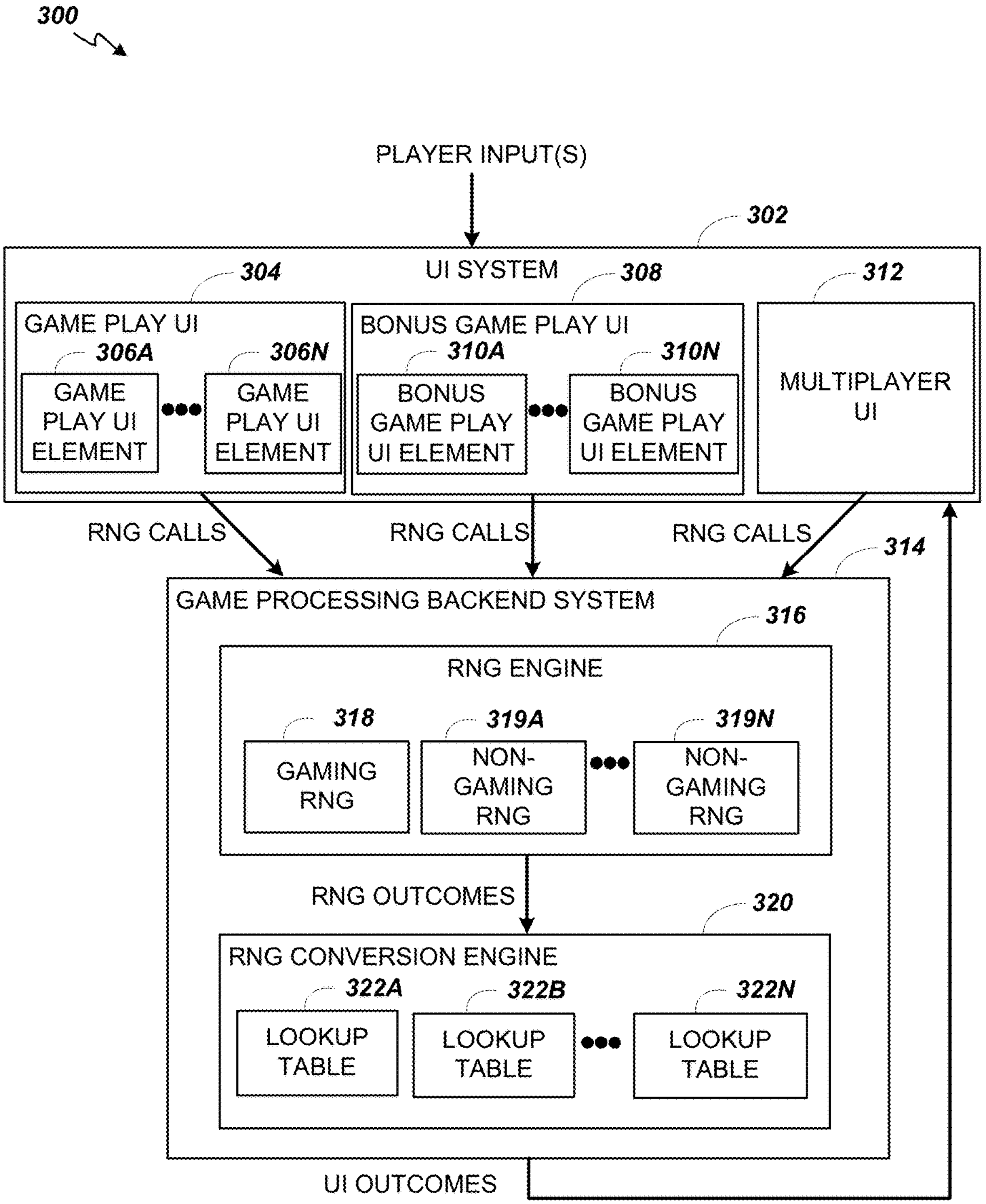
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
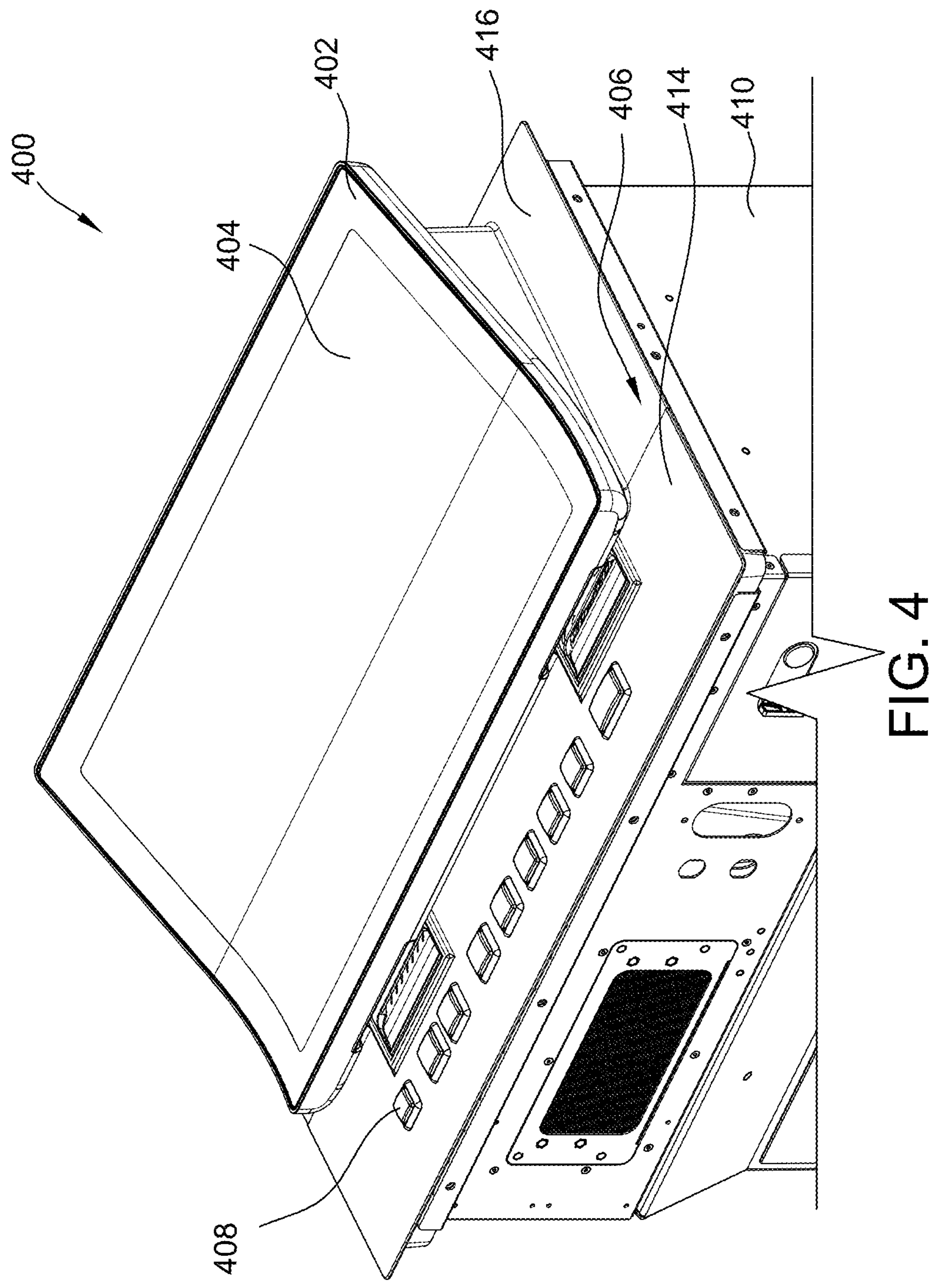
FIG. 4 is a perspective view of a bartop gaming device according to an embodiment of the present disclosure and similar to the EGMs shown in FIG. 1.
Figure 5:
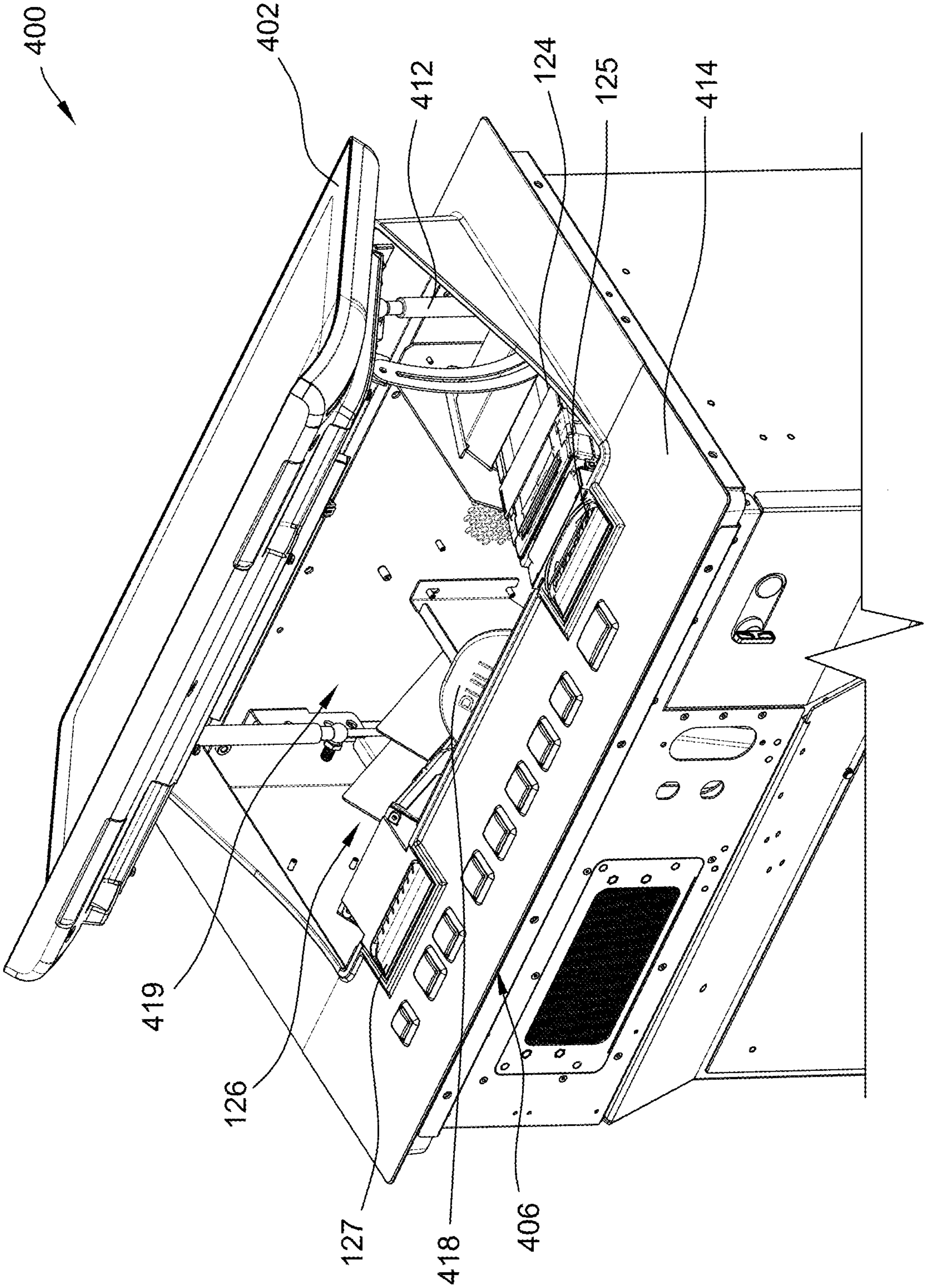
FIG. 5 is another perspective view of the bartop gaming device shown in FIG. 4 with a monitor in an open position.
Figure 6:
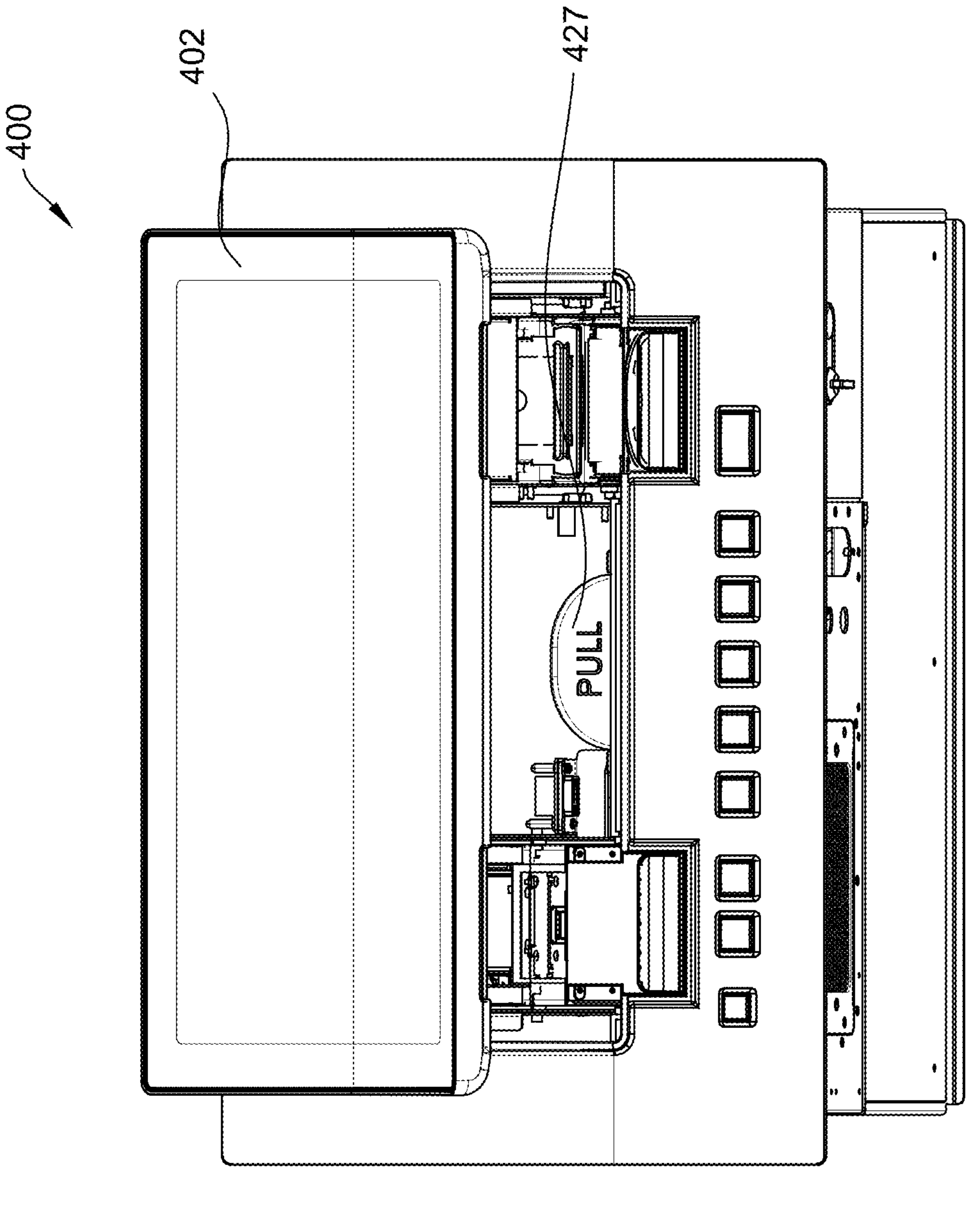
FIG. 6 is a top view of the bartop gaming device shown in FIG. 5 with the monitor in the open position.

FIGS. 4-6 depict an example bartop gaming device 400, which in some embodiments, may be an implementation of gaming devices 104A-104X described with respect to FIG. 1.

As shown in FIG. 4, bartop gaming device 400 includes a monitor 402 including a display screen 404, which may display a gaming interface to a user. Gaming device 400 may further include a button deck assembly 406 including one or more buttons 408 that may be used for interacting with gaming device 400. Bartop gaming device 400 may further include a housing 410 (alternatively referred to herein as a "cabinet") that supports monitor 402 and button deck assembly 406 and contains internal components of bartop gaming device 400 such as, for example, bill validator 124 and/or printer 126 (shown in FIG. 5). Bartop gaming device 400 may be installed within a bar counter or other similar surface, with a top surface 416 of bartop gaming device substantially flush with the bar counter surface.

As shown in FIGS. 5, monitor 402 is attached to housing 410 using one or more gas springs 412 and optionally hinges (not shown). Monitor 402 is moveable relative to housing 410 to enable monitor 402 to be swung upward and backward from a "lowered" or "closed" position (as shown in FIG. 4) to a "raised" or "open" position (as shown in FIGS. 5 and 6), providing access to components located within housing 410, such as bill validator 124 and printer 126. Gas springs 412 are coupled between monitor 402 and housing 410 and provide an upward force to ease lifting of monitor 402 into the open position.

Figure 7:
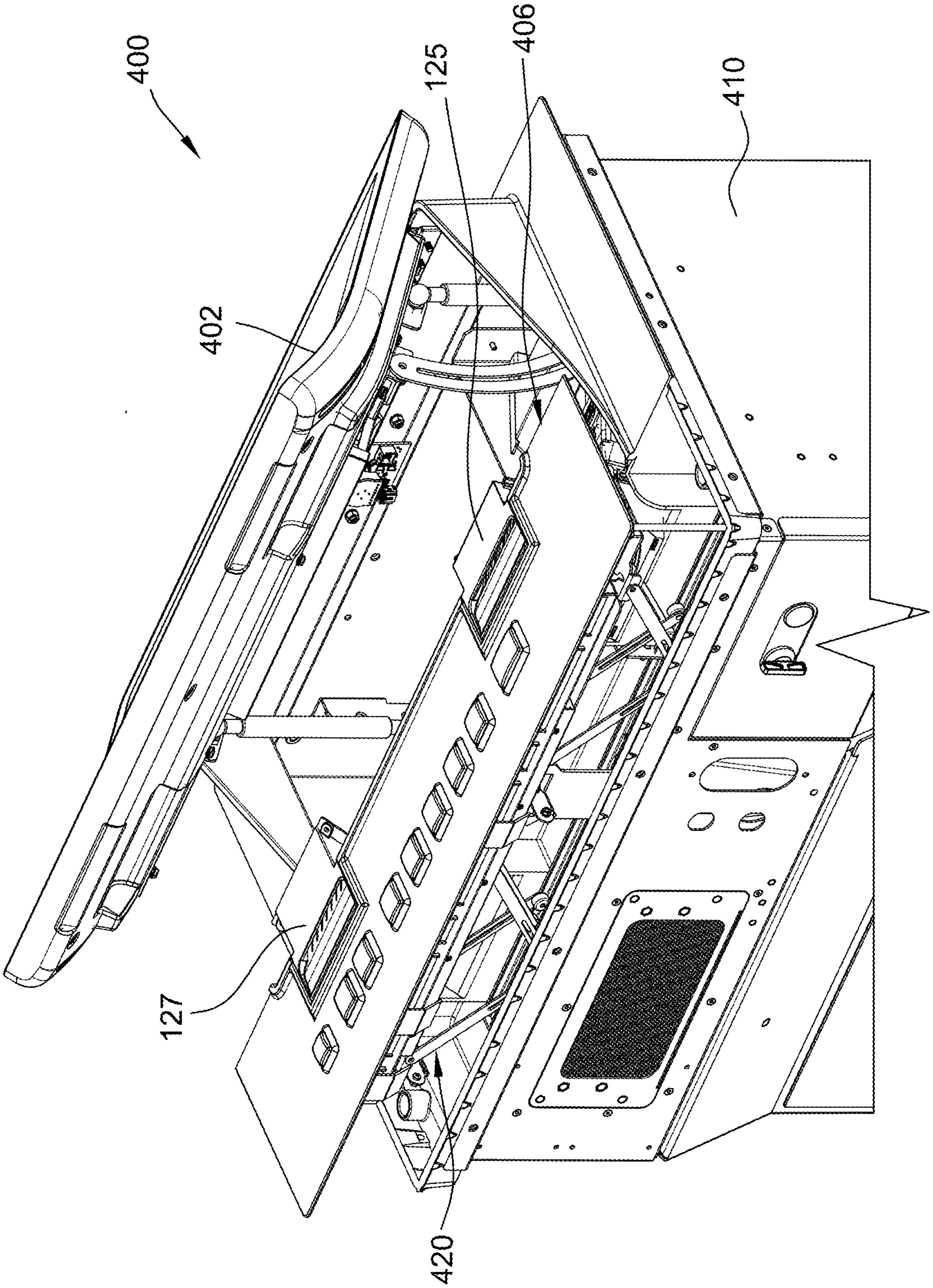
FIG. 7 is another perspective view of the bartop gaming device shown in FIG. 4 with the monitor in the open position and with a button deck assembly in a lifted position.
Figure 8:
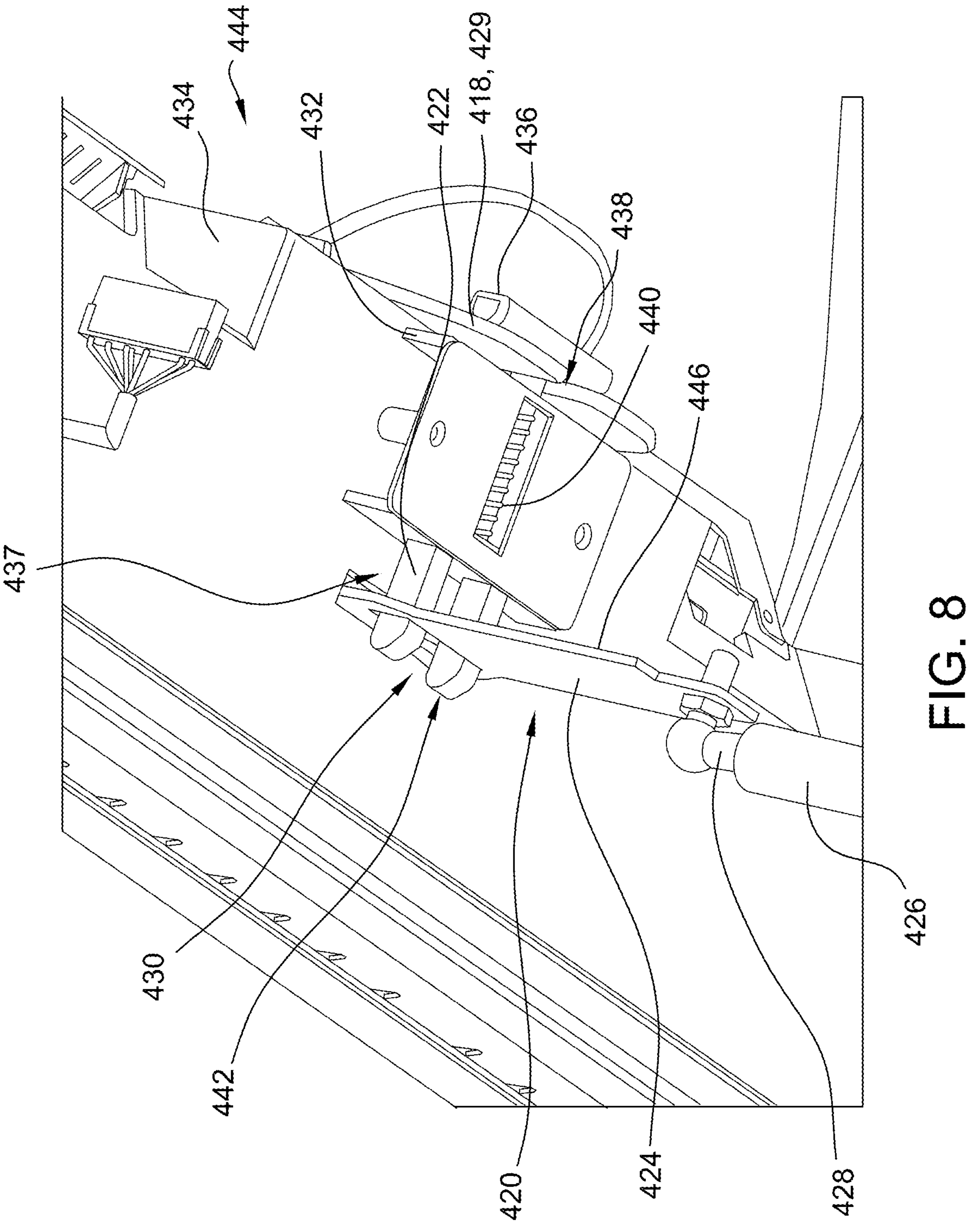
FIG. 8 is a perspective view of a portion of the bartop gaming device shown in FIG. 4, showing a release assembly engaged with a lift assembly.

In the example embodiment, button deck assembly 406 is moveable relative to housing 410 to facilitate servicing one or more components of button deck assembly 406, such as buttons 408, when monitor 402 is in the raised position. For example, as shown in FIG. 4, button deck assembly 406 has a top surface 414 that is substantially flush with top surface 416 of housing 410 during gameplay when monitor 402 is in the closed position. Referring to FIG. 5, monitor 402, which has a curved neck in the front position of monitor 402 that is elevated in relation to the rest of monitor 402, has been put in the raised position. The curved neck in the front position of monitor 402 allows, for example, a service technician to the monitor 402 to be raised. When the monitor 402 is in the raised position, an internal cavity 419 of the housing 410 is exposed, providing access to a release lever 418. The release lever 418 is a paddle lever that includes a top paddle section 427 (shown in FIG. 6) and a lower paddle section 429 (shown in FIG. 8) that is obliquely oriented to the top paddle section 427. The lever 418 is pivotally coupled to the housing 410 at a position approximately midway along a vertical length of the paddle lever 418 and at an intersection of the top paddle section 427 and the lower paddle section 429. The release lever 418 is further coupled to a deck lift assembly 420 (shown in FIG. 7) of gaming device 400 at the lower paddle section 429, as shown in FIG. 8. When the release lever 418 is actuated, the release lever 418 disconnects a latch 437 (shown in FIG. 8) from the deck lift assembly 420, allowing the deck lift assembly 420 to raise button deck assembly 406 from housing 410, as shown in FIG. 7.

Gaming device 400 includes a bill validator bezel 125 and printer bezel 127 that provide landing surfaces for feeding or dispensing tickets and/or bills from bill validator 124 and printer 126, respectively (shown in FIG. 5). In the example embodiment, bill validator bezel 125 and printer bezel 127 are each coupled to button deck assembly 406. For example, as shown in FIG. 5, bill validator bezel 125 and printer bezel 127 are each defined on top surface 414 of button deck assembly 406. When button deck assembly 406 is raised, as shown in FIG. 7, bill validator bezel 125 and printer bezel 127 are each raised with button deck assembly 406. In other embodiments, one or more of the bezels 125 and 127 may be a separate component from button deck assembly 406 such that bezels 125 and 127 are not raised with button deck assembly 406. For example, in some embodiments, bezels 125 and 127 are coupled to, integrated with, and/or at least partially defined by the monitor 402. In other embodiments, bezels 125 and 127 are coupled to, integrated with, and/or at least partially defined bill validator 124 and printer 126, respectively.

Referring to FIG. 8, the deck lift assembly 420 is shown in a lowered position and locked by the release lever 418, or more specifically, by prongs 422 connected to release lever 418. The lift assembly 420 includes a deck locking bracket 424 and a lift drive 426 or "actuator" coupled to deck locking bracket 424. In the example embodiment lift drive 426 is a gas spring that includes a piston 428 which is attached to deck locking bracket 424 and biased by gas in the gas spring to move linearly (e.g., vertically upward). Deck locking bracket 424 defines a slot 430 extending therethrough. A pair of prongs 422 are connected to the release lever 418 and extend through slots (not shown) defined in a cabinet locking bracket 432 and the slot 430 defined in deck locking bracket 424.

Figure 12:
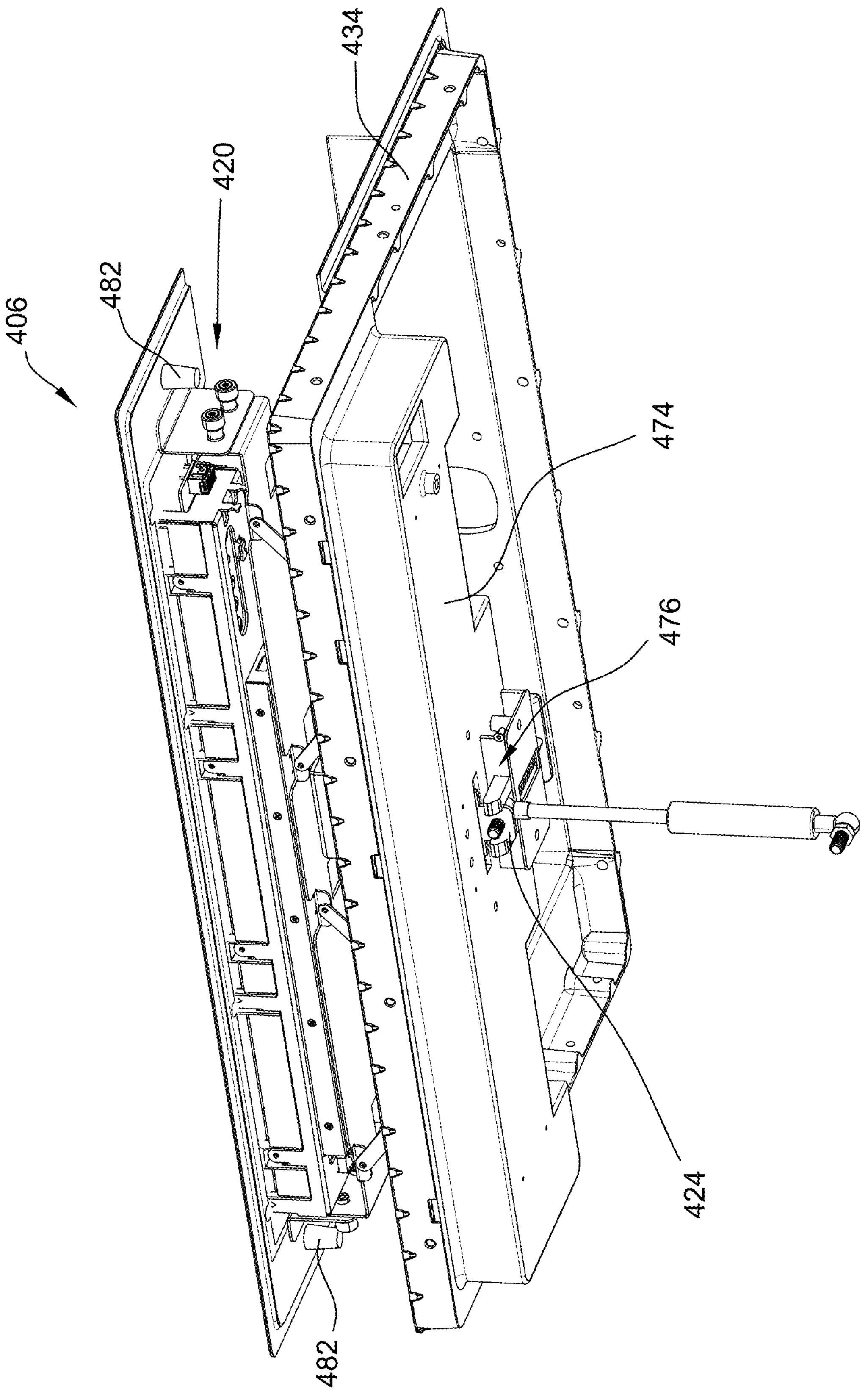
FIG. 12 is a perspective view of a portion of the gaming device shown in FIG. 4, with the button deck assembly in the lifted position.
Figure 13:
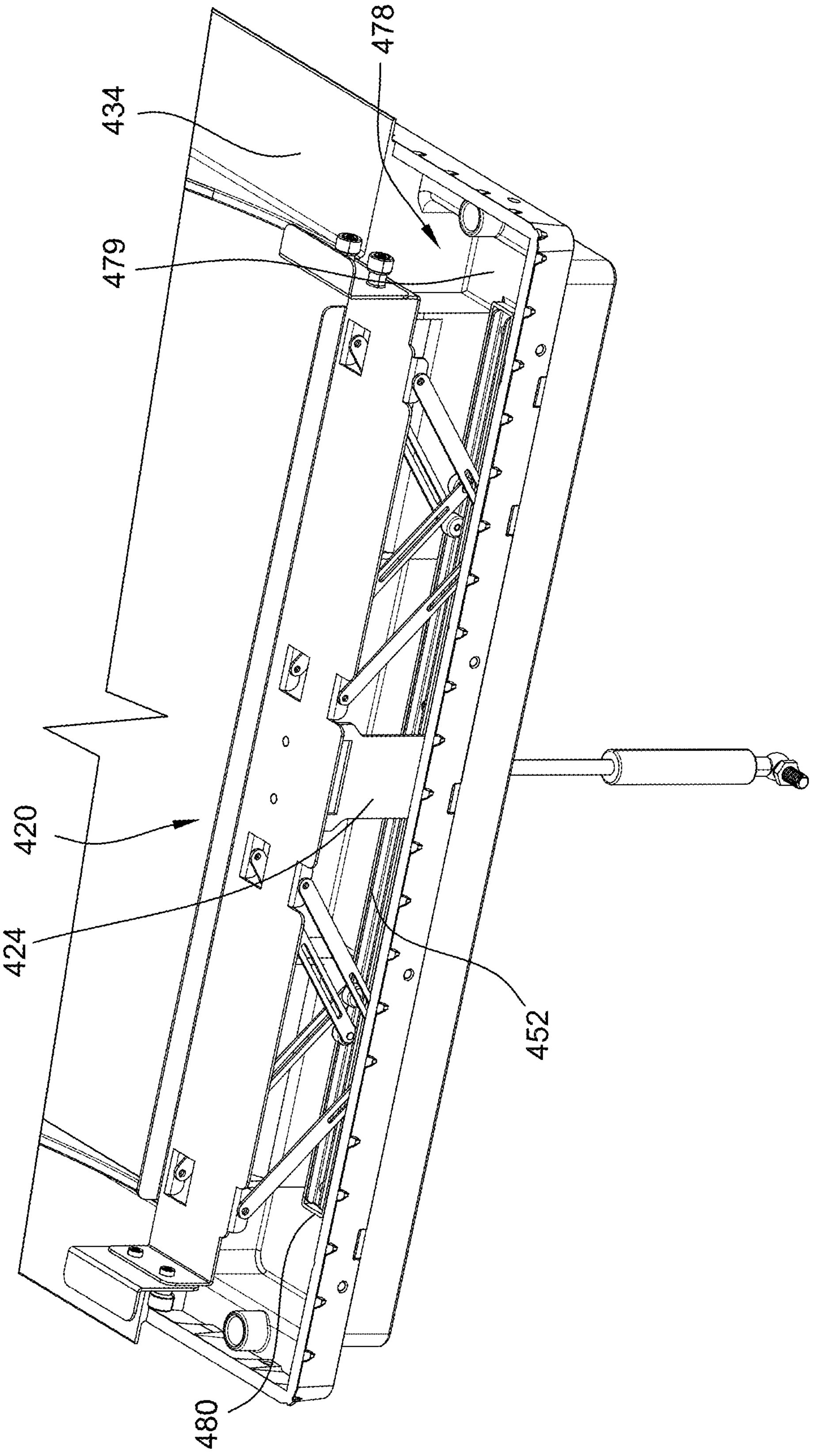
FIG. 13 is a perspective view of the portion of the gaming device shown in FIG. 12 and the lift assembly shown in FIG. 10.
Figure 14:
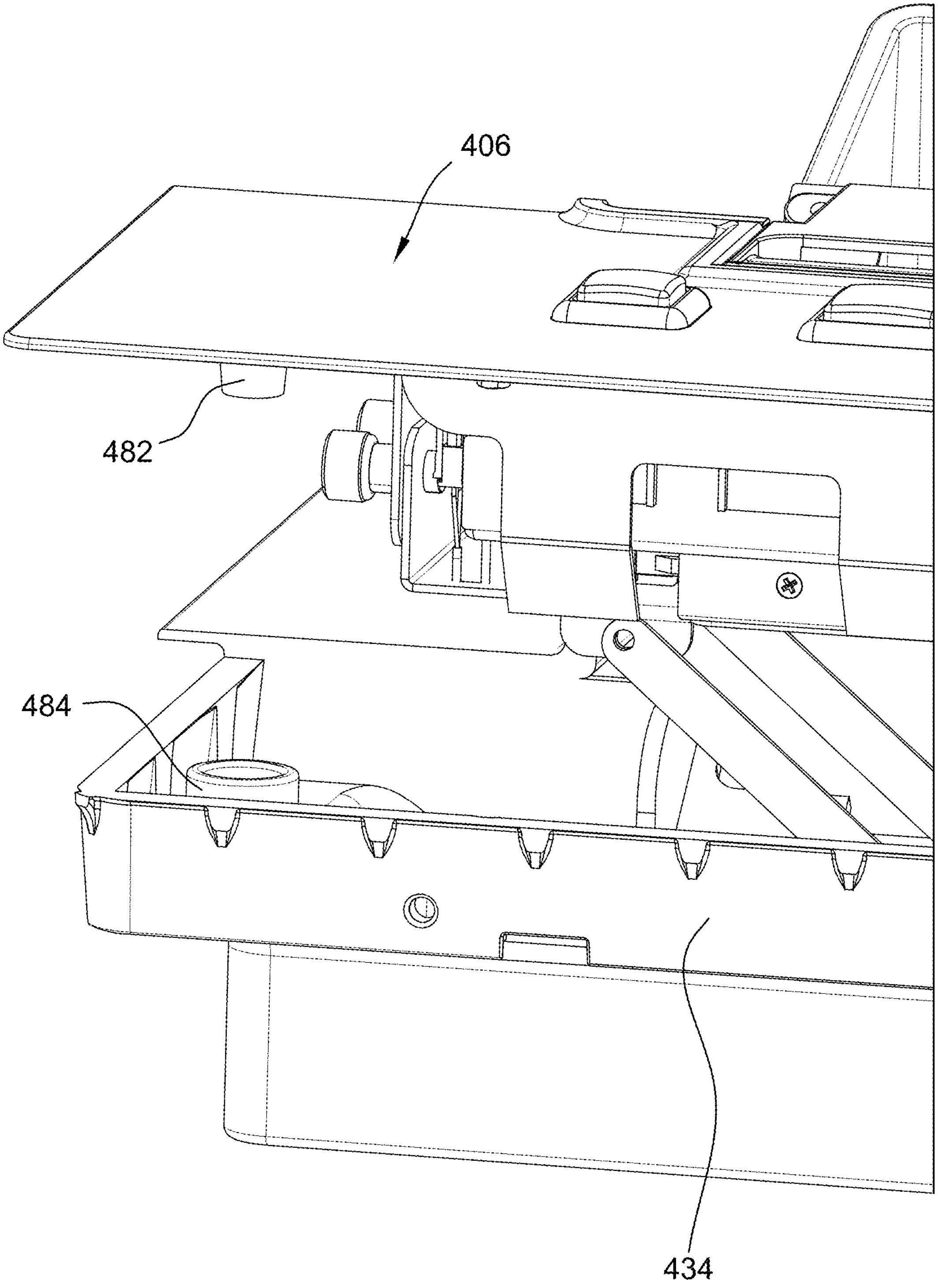
FIG. 14 is an enlarged perspective view of the portion of the gaming device shown in FIG. 12.

The cabinet locking bracket 432 is attached to or optionally integrally formed with a casting collar 434. The casting collar 434 is attached to housing 410 (shown in FIG. 1). In some embodiments, casting collar 434 may be a single piece construction with housing 410. In the example embodiment, casting collar 434, which is also shown in FIGS. 12-14, is a drip tray that attaches to housing 410 and is configured to collect spilled liquids that may leak through into the internal cavity 419 of housing 410.

Release lever 418 is connected to a plug 436 which extends through a cutout 438 defined in release lever 418. Plug 436 is connected to prongs 422. In the example embodiment, plug 436 and prongs 422 are unitarily formed as a single piece and collectively define a latch 437. A biasing mechanism 440 is coupled to prongs 422 and biases prongs 422 horizontally outwards through slots (not shown) in the cabinet locking bracket 432 and the slot 430 in the deck locking bracket 424, as shown in FIG. 8. Prongs 422 extend horizontally to tapered free ends 442. In the example embodiment prongs 422 are formed of a Delrin plastic, though in other embodiments other materials may be used. The release lever 418, plug 436, biasing mechanism 440, and prongs 422 collectively define a release assembly 444 of the present embodiment.

Engagement of the prongs 422 with the deck locking bracket 424 locks deck lift assembly 420 in the lowered position, preventing lift drive 426 from raising deck locking bracket 424. To release deck lift assembly 420, release lever 418 is pivoted. For example, referring to FIG. 5, the release lever 418 is pivotally coupled to the housing 410 (shown in FIG. 4) and rotatable about a rotational axis (not shown) extending horizontally of the housing 410. The release lever 418 may be rotationally pulled through the access cavity (e.g., rotating the lever toward the button deck assembly 406), causing the release lever 418 to pivot about the rotational axis (e.g., in a counter clockwise direction as shown in FIG. 5). Referring back to FIG. 8, the release lever 418 is engaged with the plug 436 at an opposed end (also referred to herein as an "interior end") such that the rotation of the release lever 418 imparts linear motion to the plug 436, causing the plug 436 to be pulled away from deck locking bracket 424 (i.e., to the right of the page in FIG. 8), along a longitudinal direction of the prongs 422, compressing biasing mechanism 440, and moving prongs 422 out of slot 430 defined in deck locking bracket 424. When prongs 422 are moved out of engagement with deck locking bracket 424, lift drive 426 raises deck locking bracket 424 relative to casting collar 434, moving button deck assembly 406 to the raised position, as shown in FIG. 7. In the example embodiment the biasing mechanism 440 is a compression spring. In other embodiment, any suitable biasing mechanism 440 may be used.

The biasing mechanism 440 biases prongs 422 outwards such that, when release lever 418 is released, plugs 422 are moved laterally back to an extended position, as shown in FIG. 8 for example, except that the slot 430 is out of alignment with the prongs 422, due to the raising of the bracket 424. Thus, when the bracket is raised the prongs 422 contact an interior surface 446 of deck locking bracket 424. When the deck lift assembly 420 is lowered to align slot 430 with prongs 422, biasing mechanism 440 biases prongs 422 back into the slot 430, securing deck lift assembly in the lowered position. In other words, release lever 418 and prongs 422 act as a slam latch, such that adjustment of the release lever 418 is not required to lock deck lift assembly 420 back into the lowered position. In the example embodiment, the taper on free ends 442 of prongs 422 reduce interference between plugs and deck locking bracket 424 as deck locking bracket is moved to/from the lowered position.

Figure 9:
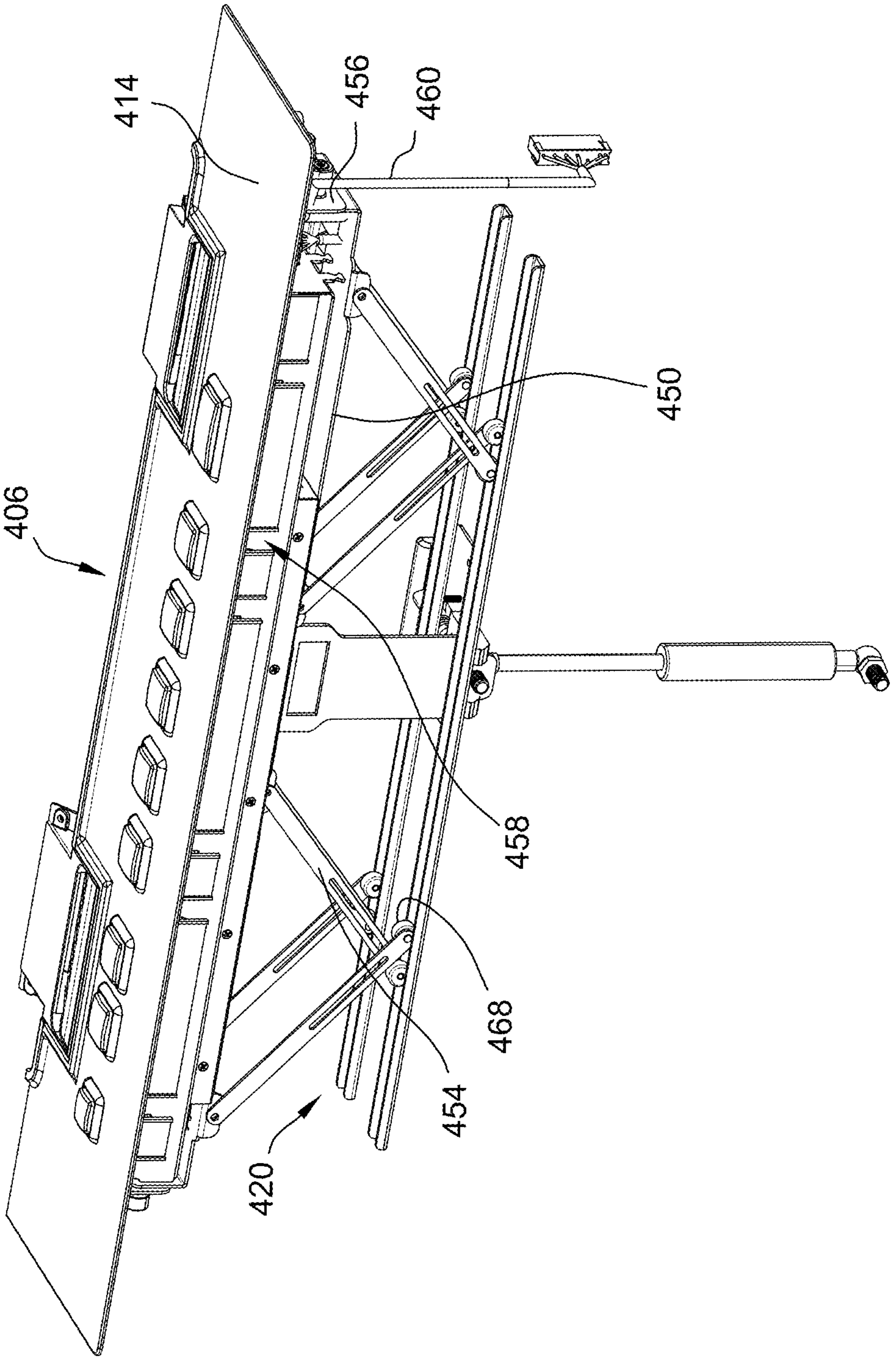
FIG. 9 is a perspective view of the lift assembly shown in FIG. 8 and the button deck assembly shown in FIG. 7.

FIG. 9 shows the button deck assembly 406 and lift assembly 420 in the raised position. In the example embodiment, deck lift assembly 420 further includes a lift frame 450, tracks 452, and a plurality of lift arms 454. Button deck assembly 406 includes a deck frame 456 that depends downward from the top surface 414 and extends at least partially around internal electronic components 458 of button deck assembly 406. An electrical connector 460 (e.g., a wire and connector) connects the internal electronic components 458 of button deck assembly 406 to other components of the gaming device 400, such as a power source or controller (not shown). The electrical connector 460 may have a sufficient length such that the button deck assembly 406 may be raised without requiring disconnection of the electrical connector 460.

Figure 11:
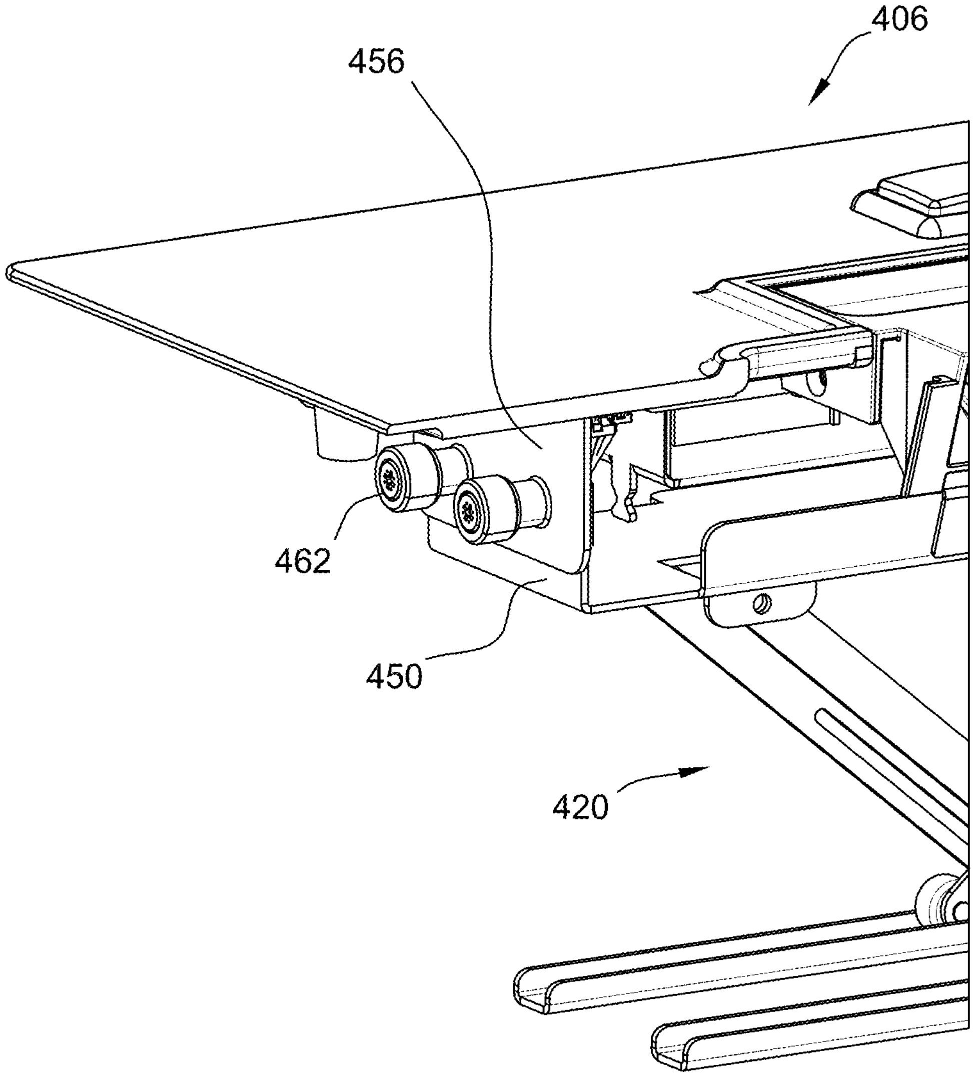
FIG. 11 is a perspective view of a portion of the lift assembly and button deck assembly shown in FIG. 9.

As shown in FIG. 11, a pair of fasteners 462 attach deck frame 456 to lift frame 450. In the example embodiment the fasteners 462 are toolless fasteners that may be hand removed by an operator without the use of tools. Specifically, fasteners 462 are spring loaded knob fasteners. In other embodiments, any suitable fasteners may be used.

Figure 10:
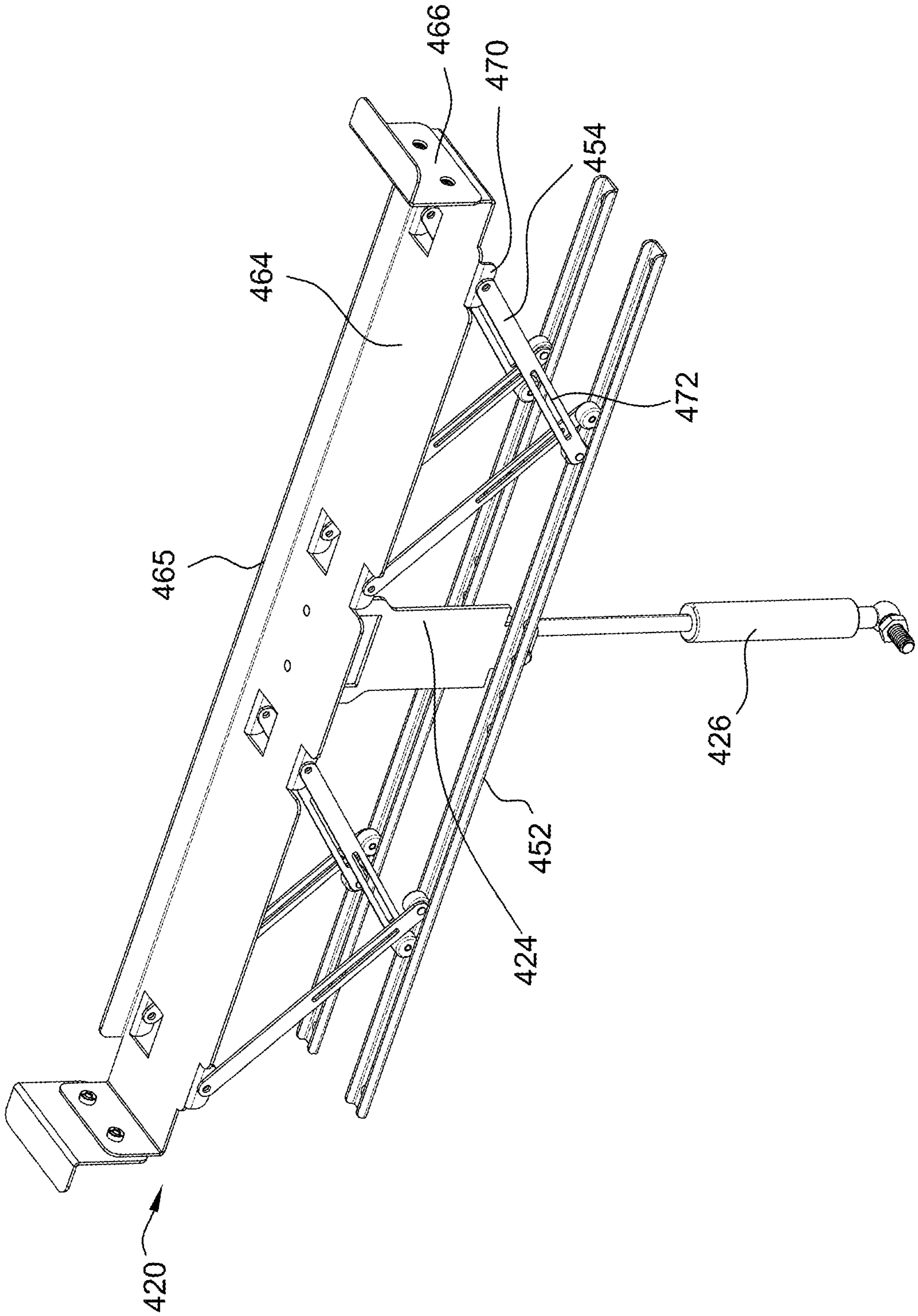
FIG. 10 is a perspective view of the lift assembly shown in FIG. 9.

Referring to FIG. 10, lift frame 450 includes a base plate 464, a back flange 465, and a pair of side flanges 466. The side flange and back flanges 465, 466 extend transversely upward from the base plate 464. The deck locking bracket 424 is coupled to base plate 464 of lift frame 450.

The lift arms 454 are pivotally connected to base plate 464, or more specifically, are pivotally connected to respective attachment flanges 470 depending transversely downwards from base plate 464. Lift arms 454 are further connected to a respective roller 468 at opposed ends. The lift arms 454 are collectively referred to herein as a “scissor lift,” in that the lift arms 454 and rollers 468 define “scissor lift arrangement” and are configured to obliquely pivot in opposed directions from adjacent lift arms 454 during movement. For example, when deck lift assembly 420 is in the lowered position, lift arms 454 each extend generally horizontally (i.e., at a low oblique angle relative to tracks 452). As deck frame 456 is raised, lift arms 454 pivot about the respective attachment flanges 470 in a rotational motion that is opposite the rotational motion of an adjacent lift arm 454. Pivoting of the lift arms 454 causes the rollers 468 to move horizontally along the tracks 452 in opposed directions from rollers 468 of adjacent arms 454. In other embodiments, any other suitable lift arms, such as linearly extending lift arms, may be used.

In the example embodiment, lift arms 454 further define slot tracks 472 along a length of the arms 454 adjacent rollers 468. In some embodiments, pins (not shown) may extend through the respective slot tracks 472 of adjacent lift arms 454 to guide positioning of the arms 454 as deck lift assembly 420 is moved.

FIGS. 12-16 show button deck assembly 406 and lift assembly 420 with the casting collar 434 of the gaming device 400. As described above, casting collar 434 may be attached to housing 410 (shown in FIG. 7) or may be integrally formed with housing 410.

As shown in FIG. 12, casting collar 434 includes a lower surface 474 defining a slot 476 therein. Deck locking bracket 424 extends through slot 476 and into an interior cavity 478 of casting collar 434, as shown in FIG. 13. Referring to FIG. 13, an interior surface 479 of casting collar 434 is provided within the interior cavity 478. A pair of track ribs 480 are coupled to and/or formed on the interior surface 479 and are sized to contain the tracks 452 of the deck lift assembly 420 therein. The track ribs 480 restrict movement of the tracks 452 along the interior surface 479.

Figure 15:
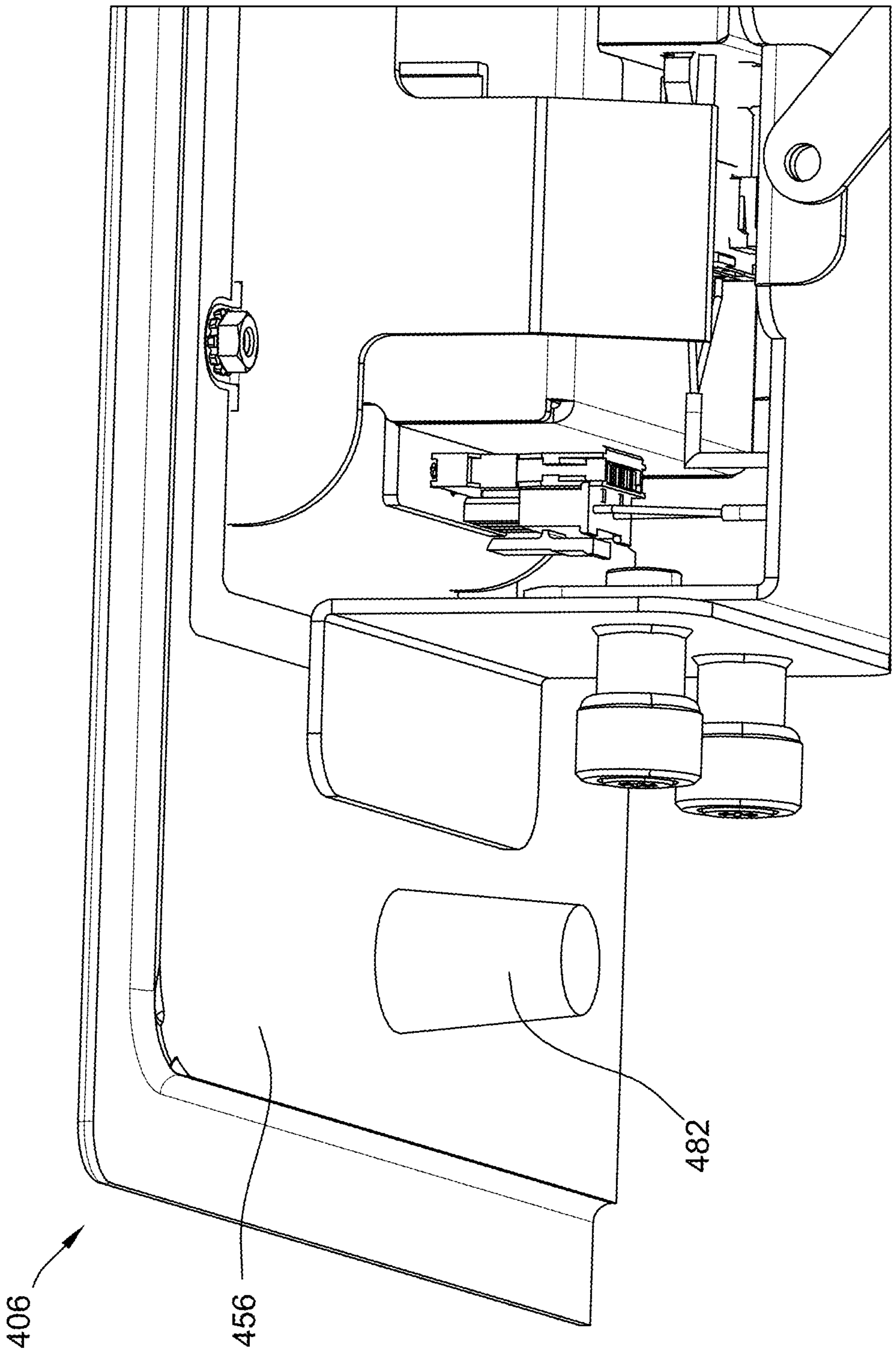
FIG. 15 is an enlarged perspective view of a portion of the button deck assembly shown in FIG. 12.
Figure 16:
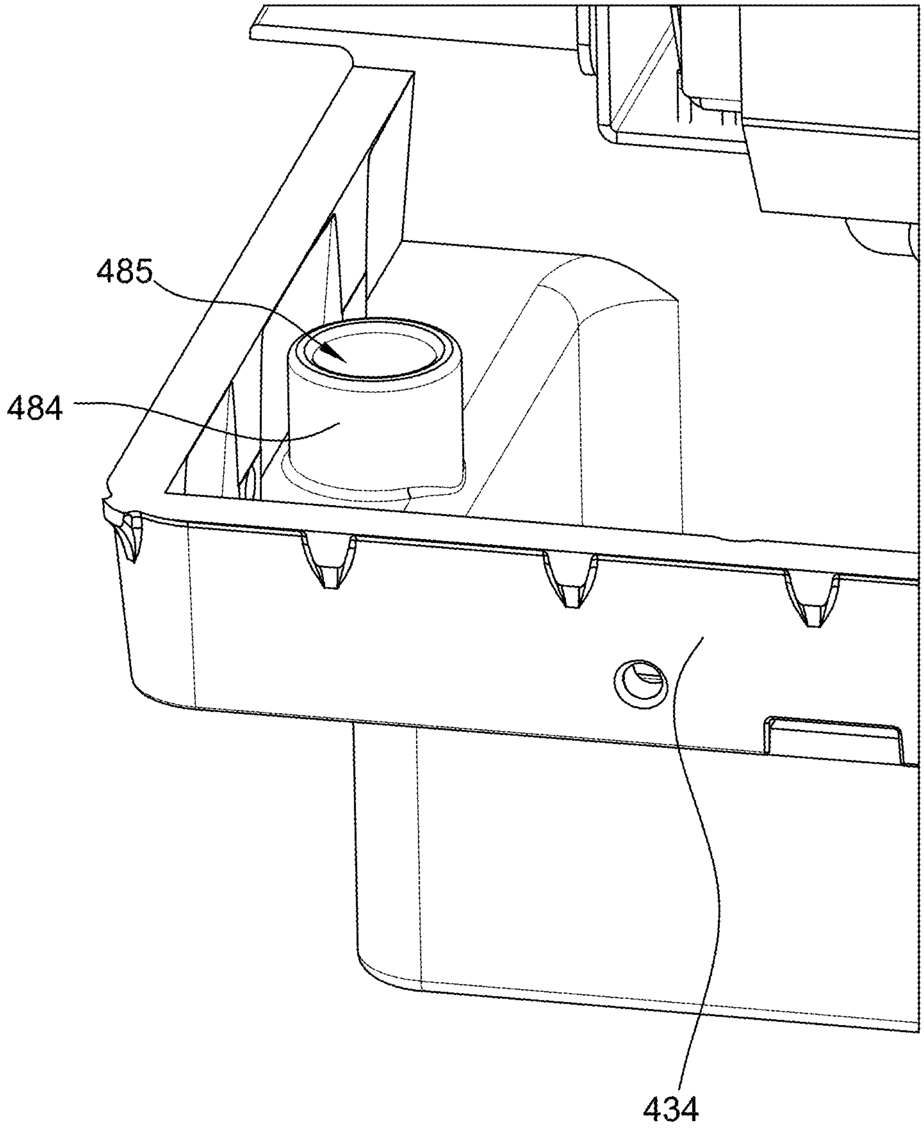
FIG. 16 is an enlarged perspective view of a portion of the gaming device shown in FIG. 12.

Referring to FIGS. 14-16, in the example embodiment button deck assembly 406 further includes guide projections 482 (two shown in FIG. 12) coupled to and/or formed with deck frame 456. Guide projections 482 extend downward from deck frame 456 and are positioned in alignment with corresponding collar guides 484 provided on casting collar 434. Guide projections 482 have a generally frustoconical shape and taper radially inwards along the extension away from deck frame 456. In other embodiments, guide projections 482 may have any suitable shape. Referring to FIG. 16, the collar guide 484 defines an opening 485 that is sized and shaped to receive the corresponding guide projection 482 therein. Collar guides 484 and guide projections 482 cooperate to control alignment of the button deck assembly 406 relative to the casting collar 434 when button deck assembly 406 is lowered from the raised position. The alignment of button deck assembly 406 with casting collar 434 reduces the potential for damage to the gaming device 400 and/or the presence of gaps between the button deck top surface 414 and the housing top surface 416 (shown in FIG. 4).

Although described herein with respect to bartop gaming device 400, button deck assembly 406 and deck lift assembly 420 described herein may be used with any suitable gaming devices, such as, but not limited to, gaming devices 104A-104X shown in FIG. 1. For example, in some alternative embodiments, monitor 402 does is not moveable to the open position as shown in FIGS. 5 and 6. In such embodiments, release lever 418 may be accessible from a different region of housing 410, such as by opening a locked cabinet door (not shown) of the housing 410, to release the button deck assembly 406. In other embodiments, the release lever 418 may be triggered electronically.

Figure 17:
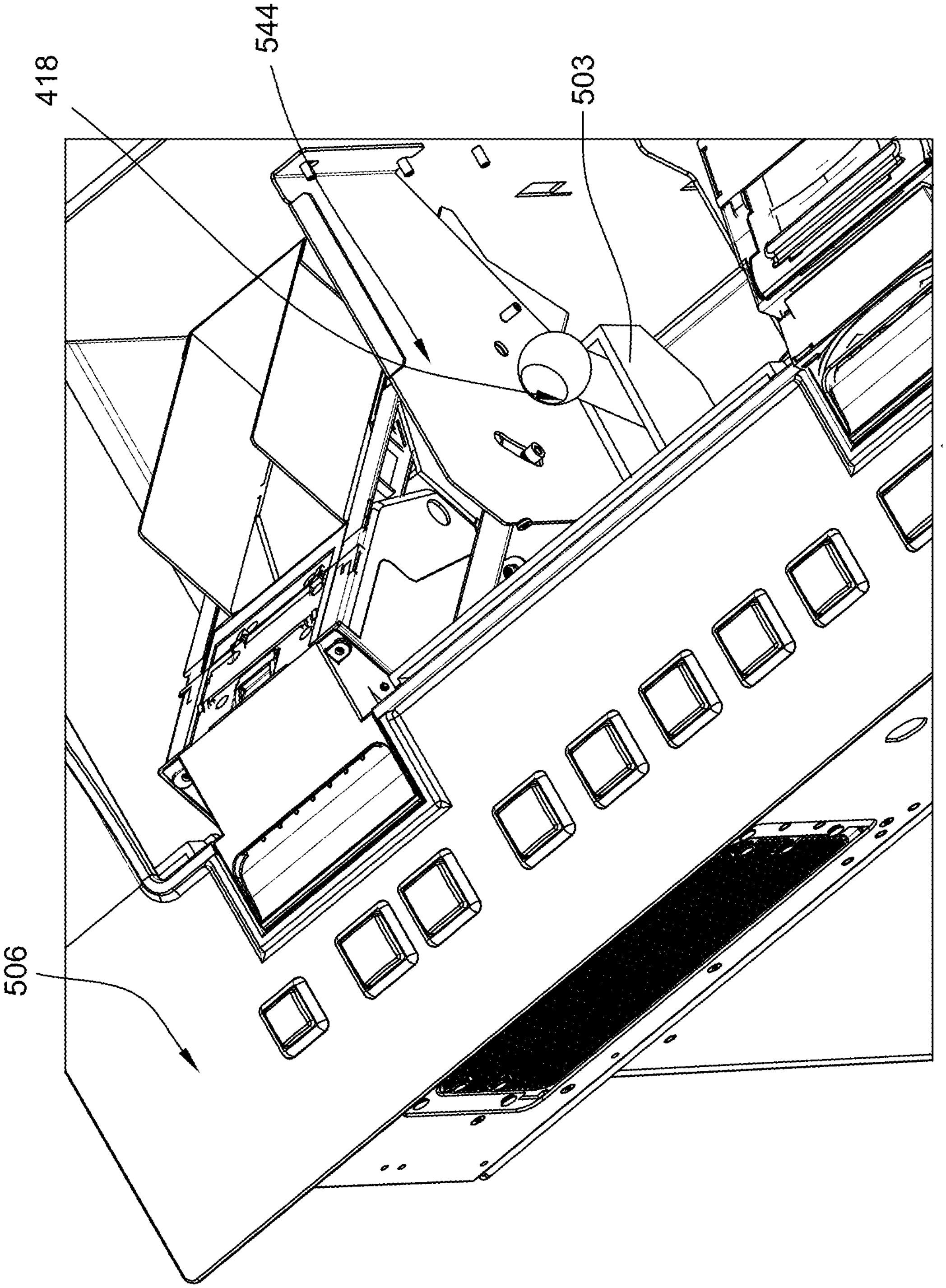
FIG. 17 is a perspective view of an alternative gaming device including an alternative release assembly.
Figure 18:
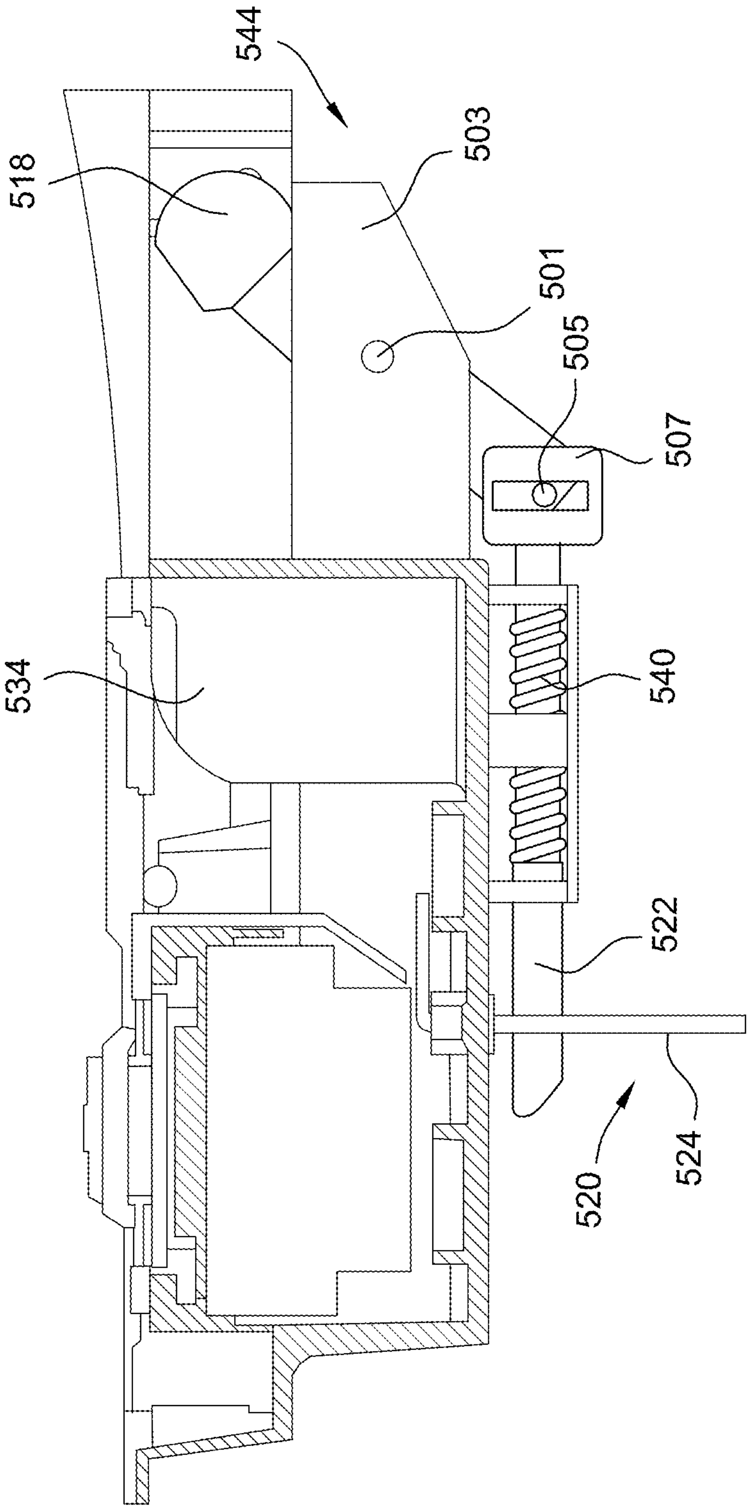
FIG. 18 is a side view of a portion of the alternative gaming device shown in FIG. 17 with the release assembly in a first position.
Figure 19:
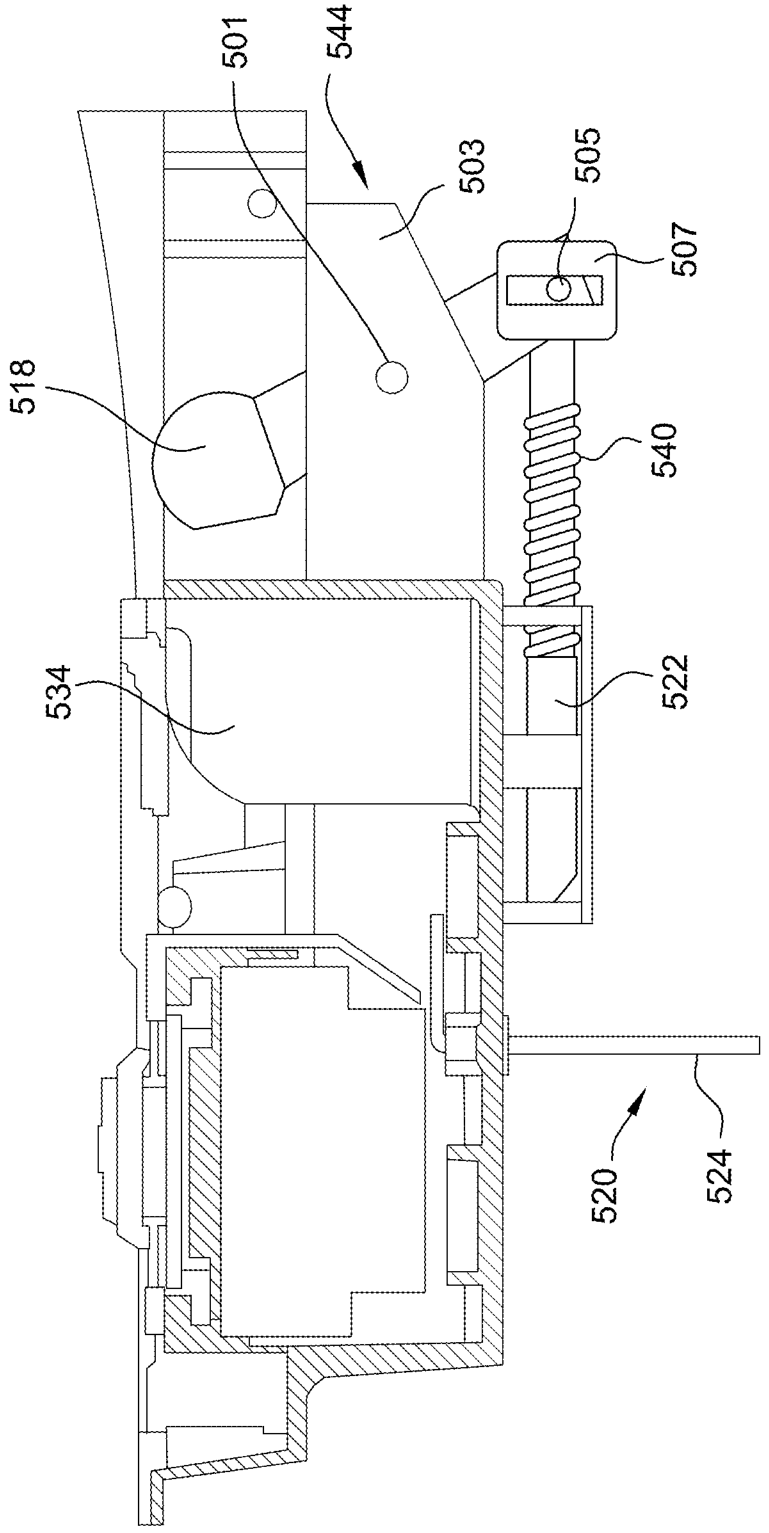
FIG. 19 is another side view of the portion of the alternative gaming device shown in FIG. 17 with the release assembly in a second position.

FIGS. 17-19 show a first alternative release assembly 544 for releasing lift assembly 520. Referring to FIG. 17, in the example embodiment, release lever 518 is a gear lever and is coupled to casting collar 534 by a lever housing 503. Release lever 518 is pivotal within the lever housing 503 to release the lift assembly 520 (shown in FIG. 18). Specifically, pulling release lever 518 towards the button deck assembly 506 releases the lift assembly 502, causing button deck assembly 506 to rise up as previously described.

Referring to FIG. 18, release assembly 544 is shown in the locked position. Release lever 518 is pivotally coupled to lever housing 503 at a first pivot point 501 and is pivotally coupled to prongs 522 at a second pivot point 505. A biasing mechanism 540 is coupled to prongs 522 and biases release assembly 544 to the locked position in substantially the same manner as described with respect to release assembly 444. To release lift assembly 520, release lever 518 is pulled toward button deck assembly 506, causing release lever to pivot about first pivot point 501 and moving lever bracket 507 rearward (i.e., to the right in FIG. 18). Rearward movement of lever bracket 507 causes retraction of prongs 522 out of deck locking bracket 524, thereby freeing deck lift assembly 520, as shown in FIG. 19. In some embodiments, the biasing mechanism 540 is a tension spring, though other suitable biasing mechanisms may be used.

Figure 20:
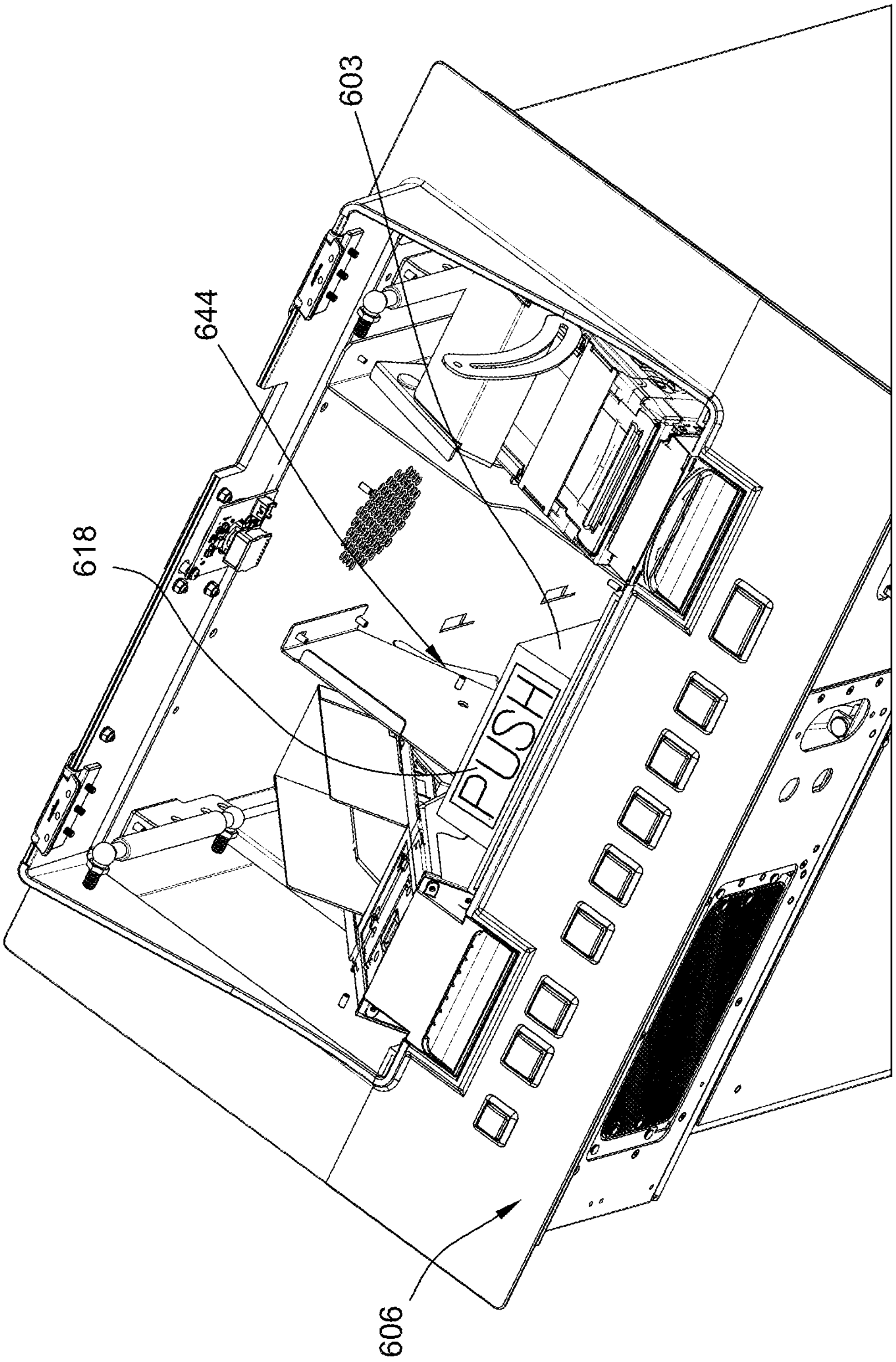
FIG. 20 is a perspective view of another alternative gaming device including another alternative release assembly.
Figure 21:
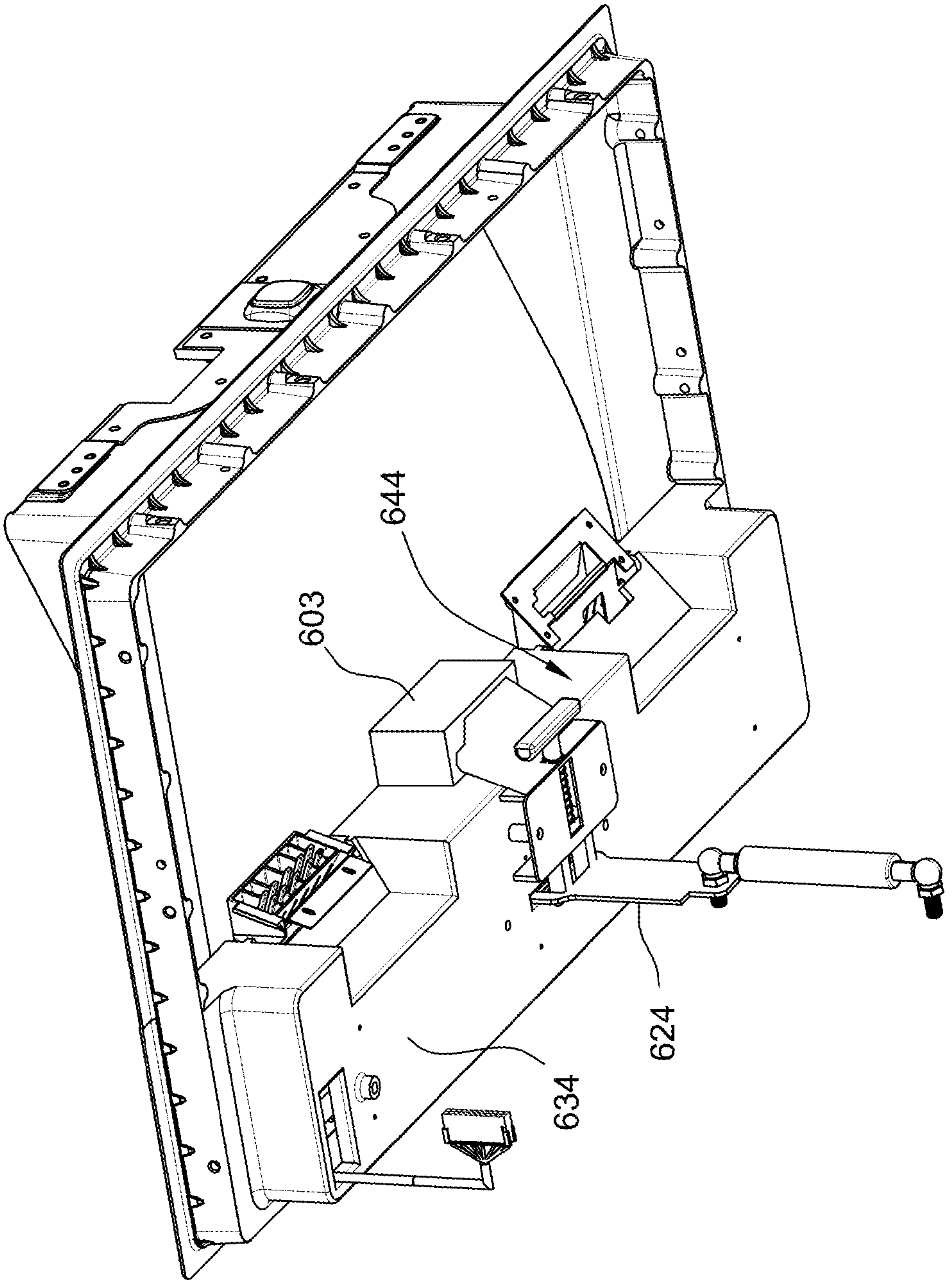
FIG. 21 is a perspective view of a portion of the gaming device and release assembly shown in FIG. 20.
Figure 22:
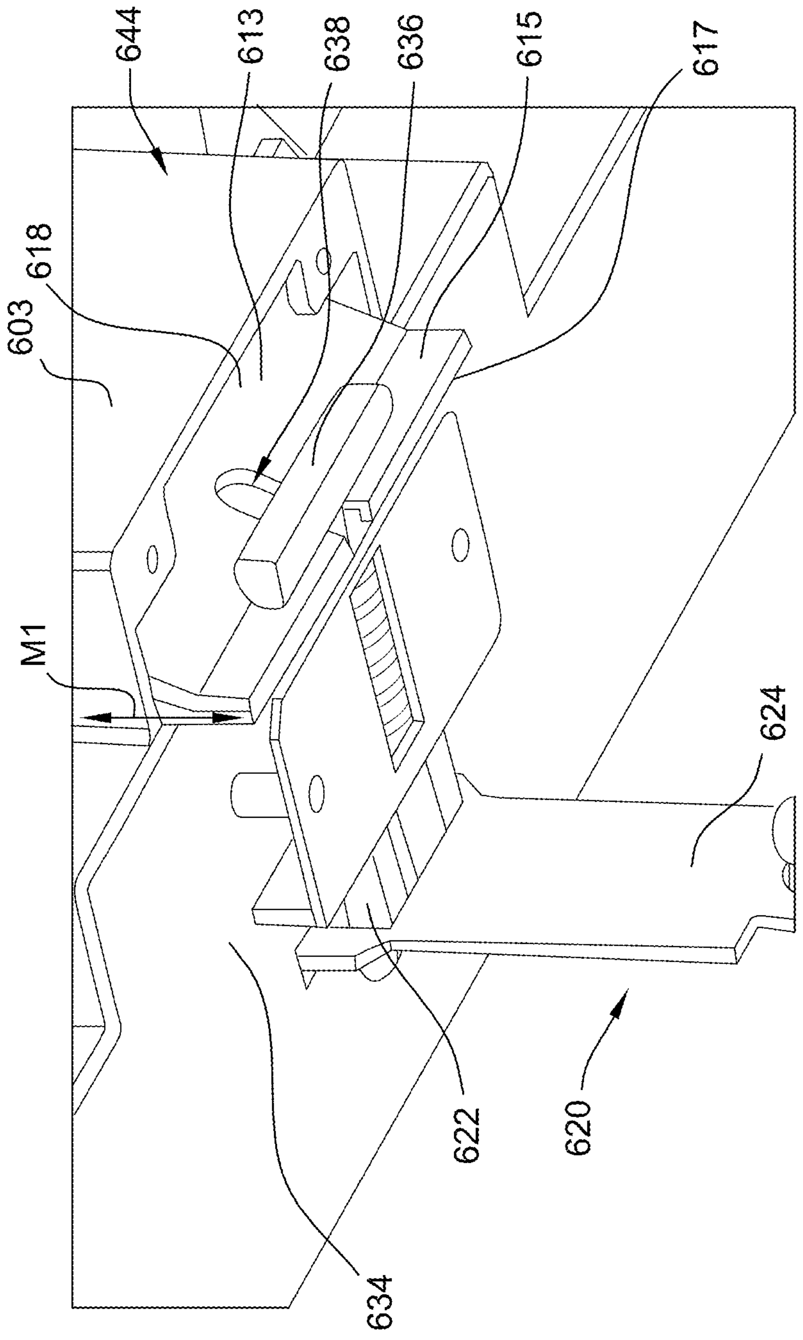
FIG. 22 is an enlarged perspective view of the portion of the gaming device and release assembly shown in FIG. 21.

FIGS. 20-22 show a second alternative release assembly 644 for releasing lift assembly 620. In the example embodiment, release lever 618 is a push type lever, that is actuated by pushing on the release lever 618, as shown in FIG. 20. Referring to FIG. 21, casting collar 634 includes a lever housing 603 which receives a portion of the lever 618 therein. As shown in FIG. 22, the release lever 618 extends outward below the lever housing 603 and defines a cutout 638 that receives a plug 636 therein. The plug is connected to the prongs 622 in substantially the same manner as described above with respect to release lever 418, shown in FIG. 8. However, in the example embodiment, plug 636 is moved rearward by downward movement of the release lever 618.

In the example embodiment, release lever 618 is configured to move relative to lever housing 603 in the directions M1, as shown in FIG. 22. Release lever 618 includes a first surface 613 that extends into lever housing 603 and a second surface 615 extending from first surface 613 and to a distal free end 617 of release lever 618. First surface 613 extends at an oblique angle relative to second surface 615, and inwards away from button deck assembly 606. When release assembly 644 is locked, as shown in FIG. 22, plug 636 contacts second surface 615. When release lever 618 is pushed, release lever 618 moves downwards along the direction M1, causing first surface 613 to contact plug 636 as plug 636 is slid along cutout 638. The slant of first surface 613 moves plug 636 horizontally inwards, causing prongs 622 to release deck locking bracket 624 and releasing the lift assembly 620. A biasing mechanism (not shown) may also be coupled to the prongs 622 to bias prongs outward to the locked position in substantially the same manner as described above with respect to the release assembly 444 shown in FIG. 8.

Figure 23:
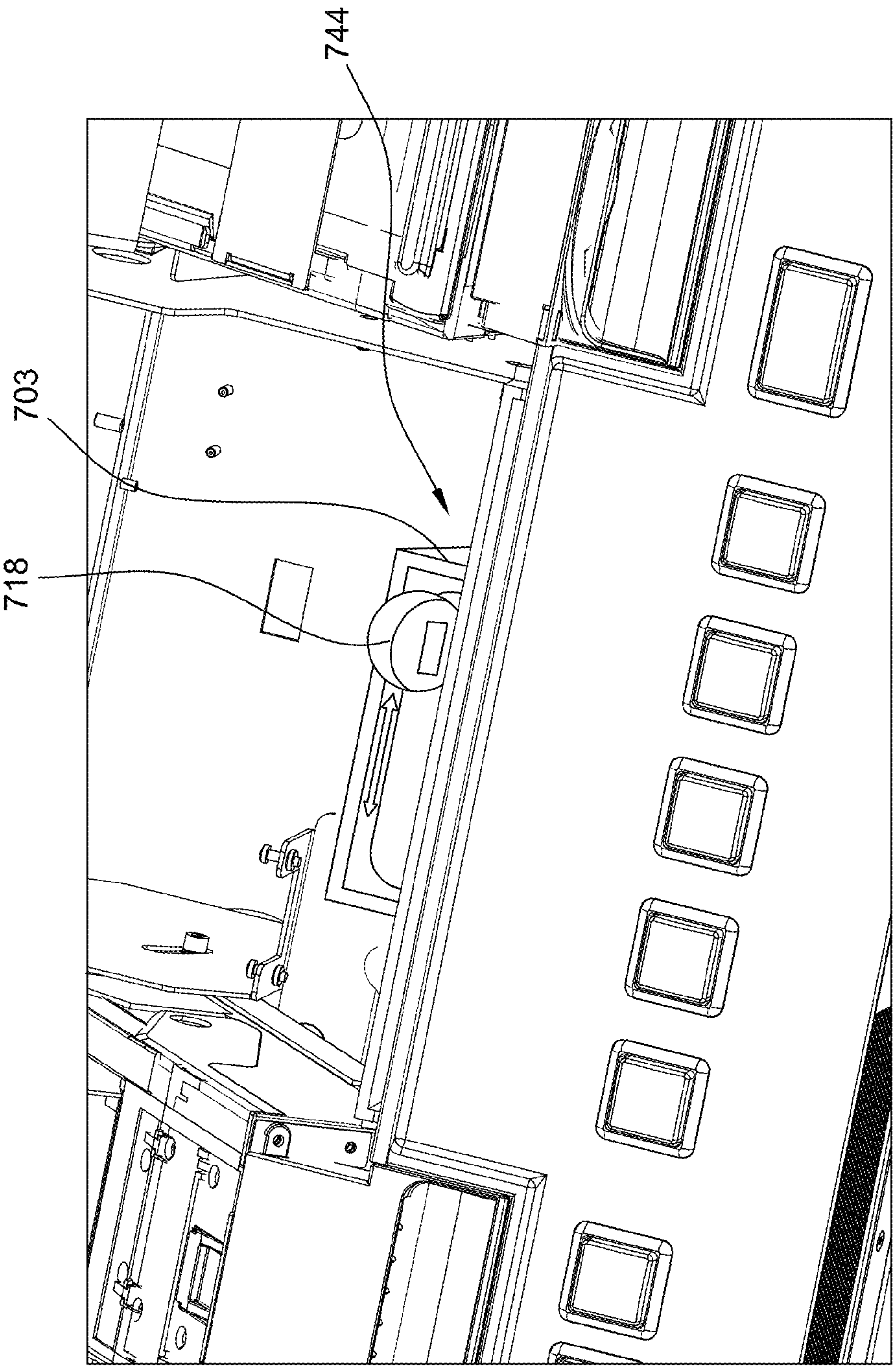
FIG. 23 is a perspective view of another alternative gaming device including another alternative release assembly.
Figure 24:
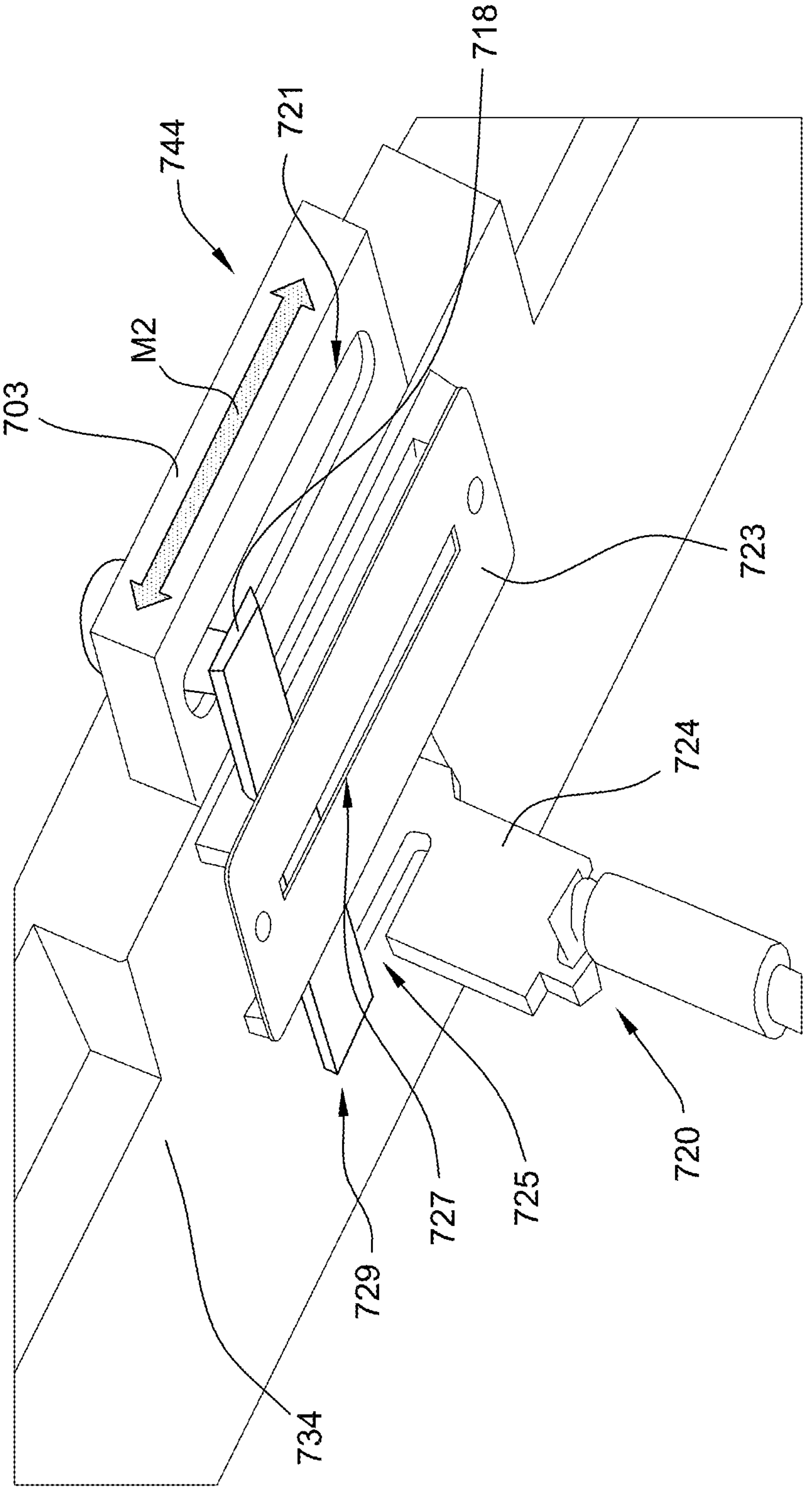
FIG. 24 is a perspective view of a portion of the alternative gaming device shown in FIG. 23 with the release assembly in a first position.
Figure 25:
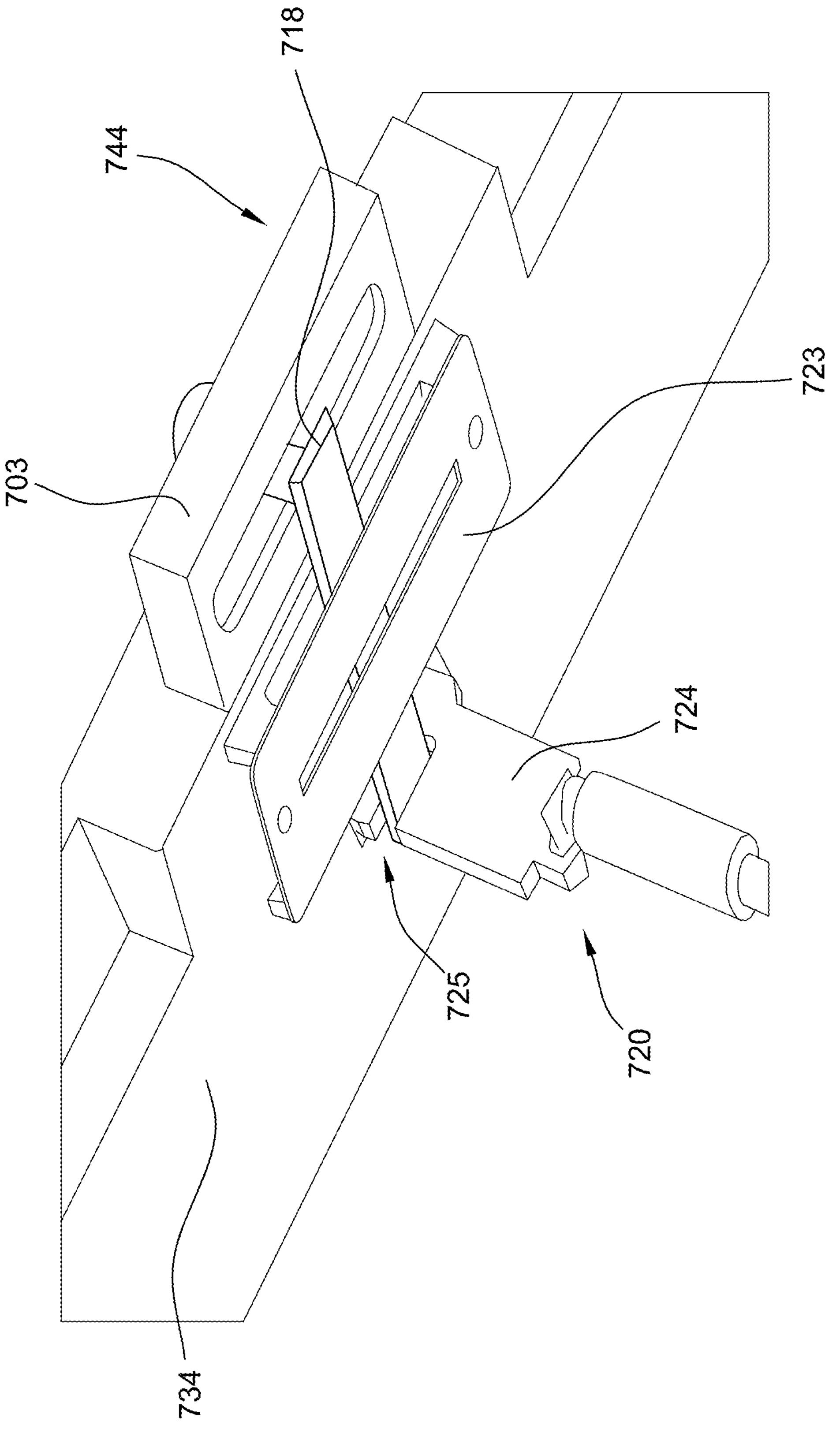
FIG. 25 is another perspective view of the portion of the alternative gaming device shown in FIG. 24 with the release assembly in a second position.

FIGS. 23-25 show a third alternative release assembly 744 for releasing lift assembly 720. Referring to FIG. 23, in the example embodiment release lever 718 is slidably coupled to lever housing 703 and is configured for horizontal movement (i.e., to the left and right in FIG. 23) relative thereto.

Referring to FIG. 24, in the example embodiment a guide plate 723 is coupled to casting collar 734. Lever housing 703 defines a lever slot 721 through which release lever 718 at least partially extends. Guide plate 723 defines a track slot 727 extending therethrough a projection (not shown) of release lever 718 extends into the track slot 727. Release lever 718 extends transversely inward from guide plate 723 to a free distal end 729. The deck locking bracket 724 defines a horizontal slot 725 that opens on a horizontal side edge of deck locking bracket 724. Release lever 718 is moveable horizontally within lever slot 721 along the direction M2. As shown in FIG. 24, release lever 718 is positioned outside of horizontal slot 725 in deck locking bracket 724 and free from obstructing raising of lifting assembly 720. Sliding the release lever 718 in the direction M2, as shown in FIG. 25, moves the release lever 718 and distal end 729 into engagement with the horizontal slot 725, locking the lift assembly 720. In some embodiments, a biasing mechanism (not shown), similar to biasing mechanism 440, may bias release lever 718 into engagement with the slot 725 (i.e., to the right of the page as shown in FIG. 25).

In further embodiments, the release assemblies 444, 544, 644, 744 described herein may additionally or alternatively include a cable for providing a releasing force to the latches and/or prongs. As an example, referring back to FIG. 8, in some embodiments a cable (not shown) may be attached to the plug 436, lever 418, or prongs 422. The cable may be a general string or wire cable for transmitting mechanical force to the latch. In some embodiments the cable is a bowden cable with a trigger. The cable may extend to an access door or another area of the gaming machine housing 410 to facilitate releasing the release assembly by a trigger that is positioned remotely from the button deck. Such embodiments may be particularly well suited for gaming machines that do not include a moveable monitor. As a result, the lift assembly and release assemblies described herein may be used with other gaming devices (e.g., any one of gaming devices 104A-104X, shown in FIG. 1).

Exemplary technical effects of the methods, systems, and apparatus described herein include at least one of: (a) providing a quick release mechanism for a button deck of a gaming device; (b) improved accessibility to areas of a gaming device; (c) improved serviceability of a gaming device and button deck; (d) reduced overall time required in servicing, installation, and/or removal of a button deck from a gaming device; (f) improved tamper prevention by providing a release lever for a button deck below a moveable monitor of the gaming device; (g) providing a secure locking of button deck assembly to a gaming device.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bartop gaming device comprising:
a housing;
a button deck assembly; and
a lift assembly for moving the button deck assembly relative to the housing, the lift assembly comprising:
  a lift frame supporting the button deck assembly;
  an arm pivotally coupled to the lift frame and extending to a track; and
  an actuator comprising a piston coupled to the lift frame, the piston being moveable relative to the track to move the button deck assembly.

2. The bartop gaming device of claim 1 further comprising a release assembly coupled to the housing, the release assembly selectively securing the button deck assembly in position relative to the housing.

3. The bartop gaming device of claim 2 further comprising a bracket coupling the actuator to the lift frame, wherein the release assembly includes a release lever and a latch coupled to the release lever, the release lever configured to move the latch between a first position in which the latch is engaged with the bracket, and a second position in which the latch is disengaged from the bracket.

4. The bartop gaming device of claim 3, wherein, when the latch is in the second position, the actuator is free to move the piston linearly to raise the button deck assembly on the housing.

5. The bartop gaming device of claim 3 wherein the release assembly further comprises a biasing element that biases the latch to the first position to provide a slam latch locking of the release assembly when the button deck assembly is lowered on the housing from a raised position.

6. The bartop gaming device of claim 3, wherein the release lever includes at least one of a paddle lever and a gear lever, the release lever being pivotally coupled to the housing at a midpoint thereof.

7. The bartop gaming device of claim 6, wherein the release lever is a gear lever and wherein the release lever is further pivotally connected to the latch.

8. The bartop gaming device of claim 3, wherein the release lever is a push button release lever.

9. The bartop gaming device of claim 1, wherein the arm is a first arm and wherein the lift assembly further comprises:

- a first roller coupled to the first arm and positioned within the track;
- a second arm pivotally connected to the lift frame and extending to the track; and
- a second roller coupled to the second arm and positioned within the track, the first and second arms defining a scissor lift arrangement of the lift assembly.

10. The bartop gaming device of claim 1, wherein the button deck assembly is removably coupled to the lift frame.

11. The bartop gaming device of claim 1, wherein the actuator is a gas spring.

12. A gaming device comprising:

- a cabinet;
- a button deck;
- a lift assembly coupling the button deck to the cabinet, the lift assembly comprising an arm pivotally coupled to the button deck and extending to a track, and an actuator coupled to the button deck and configured to move the button deck relative to the cabinet; and
- a release assembly coupled to the cabinet, the release assembly selectively securing the button deck in position relative to the cabinet.

13. The gaming device of claim 12 further comprising a bracket coupling the actuator to the button deck, wherein the release assembly includes a release lever and a latch coupled to the release lever, the release lever configured to move the latch between a first position in which the latch is engaged with the bracket, and a second position in which the latch is disengaged from the bracket.

14. The gaming device of claim 13, wherein, when the latch is in the second position, the actuator is free to move the bracket linearly to raise the button deck on the cabinet.

15. The gaming device of claim 13 wherein the release assembly further comprises a biasing element that biases the latch to the first position to provide a slam latch locking of the release assembly when the button deck is lowered on the cabinet from a raised position.

16. The gaming device of claim 13, wherein the release lever includes at least one of a paddle lever and a gear lever, the release lever being pivotally coupled to the cabinet at a midpoint thereof.

17. The gaming device of claim 16, wherein the release lever is a gear lever and wherein the release lever is further pivotally coupled to the latch.

18. A method for assembling a gaming device, the method comprising:

- coupling a button deck assembly to a lift frame of a lift assembly, the lift assembly configured to move the button deck assembly relative to a housing of the gaming device;
- coupling, pivotally, an arm to the lift frame, the arm extending to a track; and
- coupling a piston of an actuator to the lift frame, wherein the piston is moveable relative to the track to move the button deck assembly.

19. The method of claim 18 further comprising coupling a release assembly to the housing, the release assembly selectively securing the button deck assembly in position relative to the housing.

20. The method of claim 19 further comprising:

- coupling the actuator to the lift frame by a bracket; and
- coupling a lever of the release assembly to a latch, the lever configured to move the latch between a first position is which the latch is engaged with the bracket and linear movement of the actuator is restricted, and a second position in which the latch is disengaged from the bracket.

* * * * *